US008824883B2

(12) United States Patent
Saita et al.

(10) Patent No.: US 8,824,883 B2
(45) Date of Patent: Sep. 2, 2014

(54) LENS DEVICE AND IMAGE CAPTURING APPARATUS HAVING THE SAME

(71) Applicant: FUJIFILM Corporation, Tokyo (JP)

(72) Inventors: Arihiro Saita, Saitama (JP); Shigehiro Kanayama, Saitama (JP); Minoru Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/193,430

(22) Filed: Feb. 28, 2014

(65) Prior Publication Data

US 2014/0178060 A1 Jun. 26, 2014

Related U.S. Application Data

(63) Continuation of application No. PCT/JP2012/068223, filed on Jul. 18, 2012.

(30) Foreign Application Priority Data

Aug. 31, 2011 (JP) ................................ 2011-189789
Aug. 31, 2011 (JP) ................................ 2011-189791
Sep. 30, 2011 (JP) ................................ 2011-218529
May 2, 2012 (JP) ................................ 2012-105319

(51) Int. Cl.
*G03B 7/00* (2014.01)
*G03B 7/08* (2014.01)

(52) U.S. Cl.
CPC ................................... *G03B 7/0805* (2013.01)
USPC ........................................................ 396/241

(58) Field of Classification Search
CPC .................................................... G03B 7/0805
USPC ........................................................ 396/241
See application file for complete search history.

(56) References Cited

U.S. PATENT DOCUMENTS

| 4,040,067 | A | * | 8/1977 | Kondo .......................... 396/241 |
| 5,387,958 | A | | 2/1995 | Pashley |
| 2004/0218246 | A1 | | 11/2004 | Onuki et al. |
| 2010/0259824 | A1 | * | 10/2010 | Mitsuhashi et al. .......... 359/585 |

FOREIGN PATENT DOCUMENTS

| JP | 02-291203 | 12/1990 |
| JP | 05-066872 | 3/1993 |
| JP | 05-292392 | 11/1993 |
| JP | 06-90403 | 3/1994 |
| JP | 09-186922 | 7/1997 |

(Continued)

OTHER PUBLICATIONS

International Search Report PCT/JP2012/068223 dated Sep. 25, 2012.

*Primary Examiner* — Clayton E Laballe
*Assistant Examiner* — Dennis Hancock
(74) *Attorney, Agent, or Firm* — Young & Thompson

(57) ABSTRACT

A lens device (2) is provided with a first operating ring (11) for adjusting the opening surface area of an aperture device (15) and a second operating ring (12) for adjusting the transmittance of a variable light transmittance filter (16). The correspondence relation between the operational amount for the first operating ring and the rate of change in the amount of light transmitted by the aperture device and correspondence relation between the operational amount for the second operating ring and the rate of change in the amount of light transmitted by the variable light transmittance filter are the same.

18 Claims, 26 Drawing Sheets

(56) References Cited

FOREIGN PATENT DOCUMENTS

| | | |
|---|---|---|
| JP | 2002-072051 | 3/2002 |
| JP | 2002-094868 | 3/2002 |
| JP | 2002-218299 | 8/2002 |
| JP | 2004-333554 | 11/2004 |
| JP | 2005-292325 | 10/2005 |
| JP | 2006-126504 | 5/2006 |
| JP | 2007-243928 | 9/2007 |
| JP | 2009-251479 | 10/2009 |
| JP | 2011-090653 | 5/2011 |

\* cited by examiner

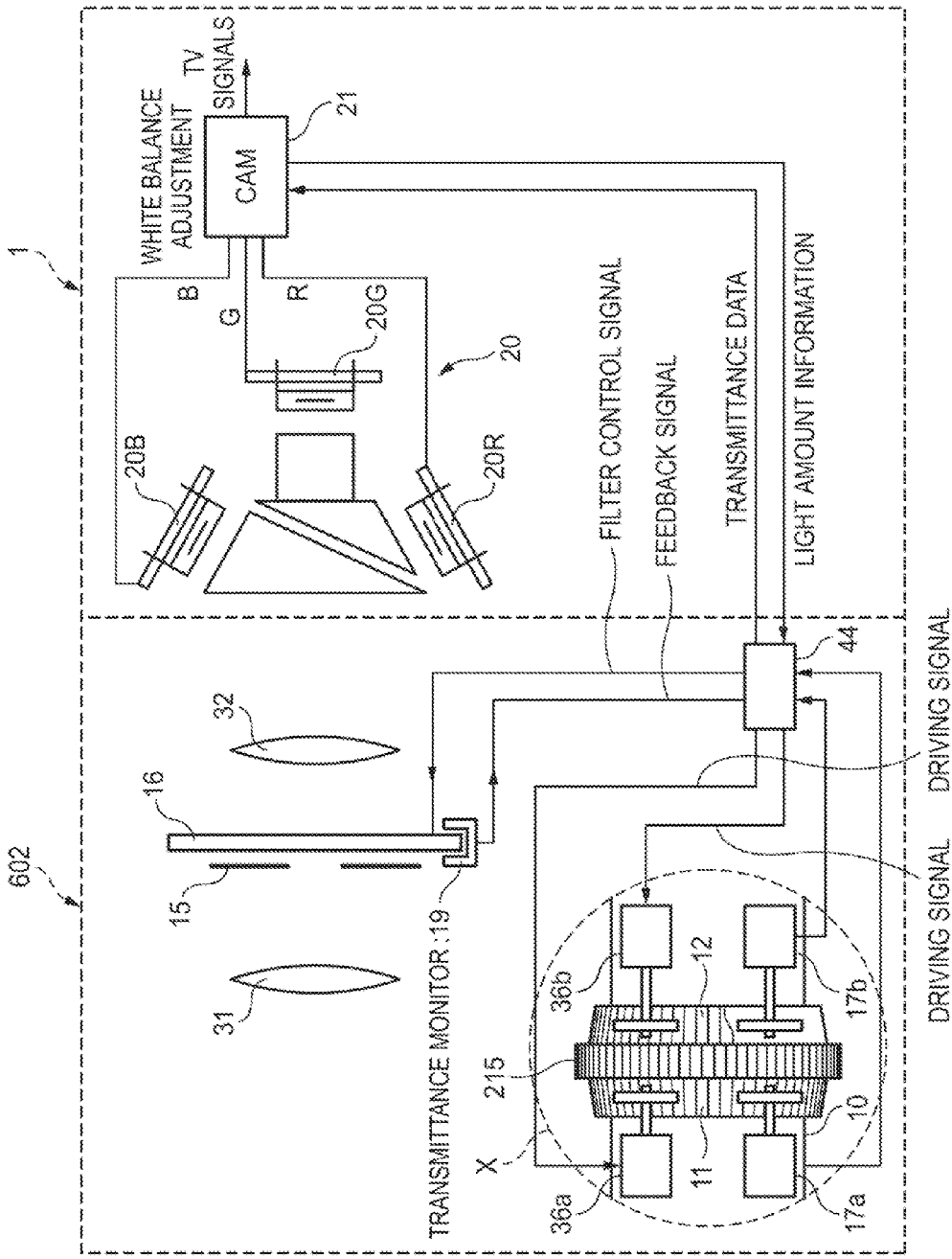

LENS DEVICE AND IMAGE CAPTURING APPARATUS HAVING THE SAME

CROSS REFERENCE TO RELATED APPLICATION

This is a continuation of International Application No. PCT/JP2012/068223 filed on Jul. 18, 2012, and claims priority from Japanese Patent Application Nos. 2011-189789, filed on Aug. 31, 2011, 2011-189791, filed on Aug. 31, 2011, 2011-218529, filed on Sep. 30, 2011 and 2012-105319, filed on May 2, 2012, the entire disclosures of which are incorporated herein by reference.

TECHNICAL FIELD

The present invention relates to a lens device of a video camera, a television camera or the like. In Particular, the present invention relates to a lens device provided with both of an operation tool configured to adjust an amount of transmitted light by manually adjusting a diaphragm device, and an operation tool configured to manually operate an amount of transmitted light of a light transmittance variable filter, and an image capturing apparatus including the lens device.

BACKGROUND ART

As for a device for adjusting a light amount, a diaphragm (iris) device is generally used. For example, in a diaphragm device 100 illustrated in FIG. 32, a plurality of (six blades in the illustrated example) diaphragm blades 101 serving as an iris are arranged on the circumference, and a driving point 102 of each of the blades 101 is moved in the direction of arrows 104 about a fulcrum 103 so as to reduce an aperture area of a center hole 105 through which incident light is transmitted.

In the diaphragm device 100, by expanding or contracting the aperture area of the center hole 105, the amount of transmitted light is adjusted. However, even if the diaphragm has the center hole 105 of which the aperture area is minimized, a correct exposure may not be obtained at the time of photographing a bright outdoor image. Further, at a diaphragm position where the center hole 105 has a relatively small aperture area, resolving power may be lowered by diffraction of light, thereby deteriorating a photographic image quality.

Accordingly, as a device for adjusting an amount of transmitted light, for example, a light transmittance variable filter disclosed in Patent Literature 1 is constituted by a disc-shaped filter in which a density of a light reduction material is continuously changed along the circumference. The amount of transmitted light of the filter is controlled by adjusting the rotational position of the disc-shaped filter.

In a light transmittance variable filter disclosed in Patent Literature 2, electrodes are attached on both surfaces of a disc-shaped dielectric elastomer placed on an optical path, and a voltage to be applied between the electrodes is adjusted to control a film thickness of the disc, thereby controlling the amount of transmitted light of the filter.

When the light transmittance variable filter disclosed in Patent Literature 1 or Patent Literature 2 is used instead of the diaphragm device illustrated in FIG. 32, a correct exposure may be obtained at the time of photographing a bright outdoor image. Thus, reduction of resolving power, which is caused by light diffraction at a diaphragm position with a relatively small aperture area, may be avoided. However, in the light transmittance variable filter, it is impossible to perform photographing which defocuses a background by expanding or contracting the aperture area to adjust the depth of field, which is an advantage of a diaphragm device.

That is, a diaphragm device and a light transmittance variable filter are the same from the standpoint of a function of being capable of adjusting an amount of transmitted light. However, since they have both merits and demerits in other functions, it is difficult to say which one is better.

Accordingly, as disclosed in Patent Literatures 3 and 4, there has been suggested an image capturing apparatus employing both a diaphragm device and a light transmittance variable filter (variable ND filter) in combination. In such an image capturing apparatus, a correct exposure may be obtained in any photographing conditions. Thus, it is possible to avoid reduction of resolving power, which is caused by light diffraction at a diaphragm position with a relatively small aperture area, as well as to adjust a depth of field. However, by being equipped with two light amount adjusting means, a cost is increased, and thus, no application to a practical machine is realized.

CITATION LIST

Patent Literature

Patent Literature 1 JP-A-2007-243928
Patent Literature 2 JP-A-2006-126504
Patent Literature 3 JP-A-9-186922
Patent Literature 4 JP-A-5-292392

SUMMARY OF INVENTION

Solution to Problem

In recent years, reduction in manufacturing cost or improvement in performance for a light transmittance variable filter has progressed so that it becomes possible to mount both a diaphragm device and a light transmittance variable filter in a practical machine of an image capturing apparatus.

However, a lens device mounted in an image capturing apparatus includes many adjustment tools (operation tools) such as a magnification adjustment ring of a zoom lens and a focus position adjustment ring, which are operated with only the touch of the hand of a photographer looking into a finder device. Accordingly, it is required to consider which specific form of an adjustment tool of a diaphragm device and an adjustment tool of a light transmittance variable filter mounted in a practical machine can provide a lens device excellent in usability.

A diaphragm device and a light transmittance variable filter have different principle structures, and independent mechanisms, but are the same from the standpoint of a function of adjusting an amount of transmitted light. Accordingly, it is required that operability of each adjustment tool (operation tool) which is a user interface be left to facilitate reduction of a photographer's load.

An object of the present invention is to provide a lens device and an image capturing apparatus having the same in which an adjustment tool of a diaphragm device and an adjustment tool of a light transmittance variable filter are shaped to be excellent in usability such that a relative relationship of an adjustment amount in the amount of transmitted light in relation to each operation amount may be intuitively grasped.

(1) It is a lens device for an image capturing apparatus incorporating a photographing lens and a diaphragm device configured to narrow an aperture area, the lens device comprising: a cylindrical housing that incorporates the photographing lens and the diaphragm device; a first operation ring that is mounted on an outer peripheral portion of the housing to be rotatable in a circumferential direction of the outer peripheral portion so as to adjust the aperture area of the diaphragm device; and a second operation ring that is mounted on the outer peripheral portion of the housing in parallel to the first operation ring to be rotatable coaxially with the first operation ring so as to adjust a transmittance of a light transmittance variable filter, wherein a correspondence relationship between an operation amount of the first operation ring and a change rate of an amount of transmitted light of the diaphragm device, and a correspondence relationship between an operation amount of the second operation ring and a change rate of an amount of transmitted light of the light transmittance variable filter are set to be the same.

(2) It is an image capturing apparatus provided with the lens device of (1).

Advantageous Effects of Invention

According to the present invention, various exposure controls may be made by combination of an adjustment of an amount of transmitted light of a diaphragm device, and an adjustment of an amount of transmitted light of a light transmittance variable filter, and thus, images according to various photographing intentions can be photographed. Furthermore, the first operation ring configured to adjust the amount of transmitted light of the diaphragm device and the second operation ring configured to adjust the amount of transmitted light of the light transmittance variable filter are set to have the same operation feeling. Thus, a photographer may perform an accurate operation only by looking into a finder without seeing the operation rings, thereby instantly reflecting photographic intensions to images.

BRIEF DESCRIPTION OF DRAWINGS

FIG. 30 illustrates a functional block diagram of a main part of the image capturing apparatus mounted with the lens device illustrated in FIGS. 29A to 29C.

DESCRIPTION OF EMBODIMENTS

Hereinafter, exemplary embodiments of the present invention will be described with reference to drawings.

Figure 1:
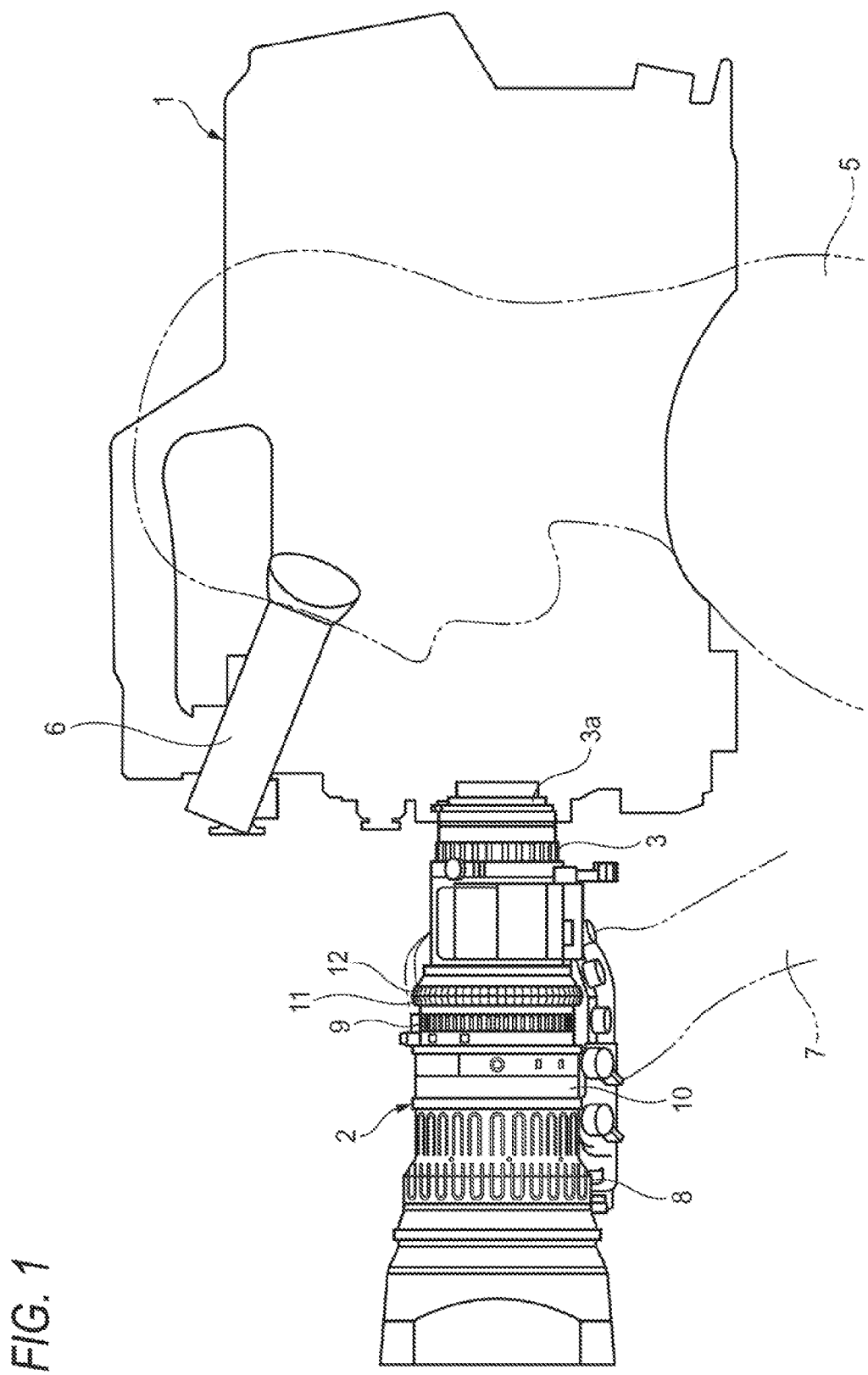
FIG. 1 is an external appearance view for explaining an exemplary embodiment of the present invention which illustrates a configuration of an example of an image capturing apparatus provided with a lens device.

FIG. 1 illustrates the external appearance for explaining an exemplary embodiment of the present invention which illustrates an example of an image capturing apparatus mounted with a lens device.

The image capturing apparatus illustrated in FIG. 1 is provided with an image capturing apparatus body 1 and a lens device 2 mounted on the front portion thereof.

The lens device 2 is provided with a cylindrical housing 10 of a cylinder shape or the like. A photographing lens such as a zoom lens or a focus lens, and a diaphragm device capable of adjusting an aperture area are incorporated in the housing 10. In the present lens device 2, a light transmittance variable filter (variable ND filter) is also incorporated in the housing 10.

A mounting portion 3 is formed on the base portion of the housing 10. When a connection portion 3a of the mounting portion 3 is detachably mounted on a lens mounting portion provided on the front portion of the image capturing apparatus body 1, the lens device 2 is fixed to the image capturing apparatus body 1.

The connection portion 3a is provided with various connection terminals (electrical terminals) which are not illustrated. Also, the lens mounting portion of the image capturing apparatus body 1 is also provided with connection terminals (electrical terminals) corresponding to the various connection terminals of the lens device 2 side. When the lens device 2 is mounted on the image capturing apparatus body 1, corresponding connection terminals of the lens device 2 and the image capturing apparatus body 1 are electrically connected to each other. Accordingly, a control device (not illustrated) of the lens device 2 acquires required information from the image capturing apparatus body 1 side. Also, a control device of the image capturing apparatus body 1 side acquires required information from the lens device 2 side.

A photographer 5 looks into a finder device 6 with his/her right eye while carrying the image capturing apparatus body 1 on his/her right shoulder. The photographer 5 fixes the image capturing apparatus by holding a holding portion of the lens device 2 with a right hand 7 so as to photograph a moving image of a photographic subject. Here, the photographer 5 operates various operation tools provided in the lens device 2 with a left hand by relying on only the touch of the left hand.

In the lens device 2, for example, a focus ring 8 as an operation tool configured to adjust focus is provided to be rotatable around outer periphery of the lens device 2 at the lens front end side (photographic subject side). The photographer 5 may rotate the focus ring 8 at an arbitrary angle with the left hand so as to adjust the focus.

A zoom ring 9 as an operation tool configured to adjust zoom is provided to be rotatable around outer periphery of the lens device 2 at a central portion of the lens device 2. The photographer 5 may rotate the zoom ring 9 at an arbitrary angle with the left hand so as to adjust the zoom.

In the lens device 2, an iris ring (first operation ring) 11 as an operation tool configured to adjust an amount of transmitted light of a diaphragm device, and an ND filter ring (second operation ring) 12 as an operation tool configured to adjust an amount of transmitted light of a light transmittance variable filter are provided close to each other at the zoom ring 9 side closer to the image capturing apparatus body 1. Either the diaphragm iris ring 11 or the ND filter ring 12 may be optionally arranged at the photographic subject side.

The iris ring 11 is provided to be rotatable around the outer periphery of the lens device 2. The ND filter ring 12 is also is provided to be rotatable around the outer periphery of the lens device 2. The iris ring 11 and the ND filter ring 12 are provided such that their respective rotation axes are parallel to an optical axis direction of the lens device 2 and they are coaxially rotatable.

For example, when the same type of filter as that disclosed in Patent Literature 2, which adjusts transmission by voltage, is used as the light transmittance variable filter, it is required to convert the rotation angle of the ND filter ring 12 into a voltage value to be applied to the light transmittance variable filter. In this case, to the ND filter ring 12, a potentiometer configured to detect the rotation angle of the ND filter ring 12 is attached.

The iris ring 11 and the ND filter ring 12 may have a structure from which a click feeling may be obtained, for example, at every predetermined turning angle ($\alpha$). This is because it is desirable that the photographer 5 is allowed to understand without visually viewing the rotation angle, how much the rotation has been made, that is, how much amount of transmitted light has been adjusted.

Figure 2:
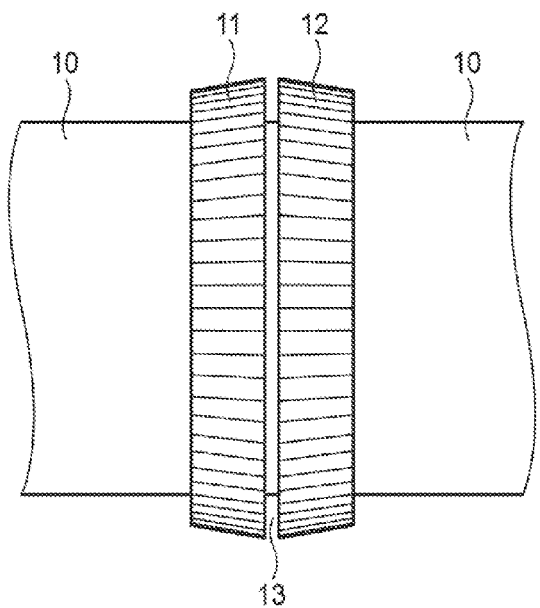
FIG. 2 is a side view illustrating a configuration of an example of an operation portion provided with an operation tool (iris ring) of a diaphragm device and an operation tool (ND filter ring) of a light transmittance variable filter in the lens device illustrated in FIG. 1.
Figure 3:
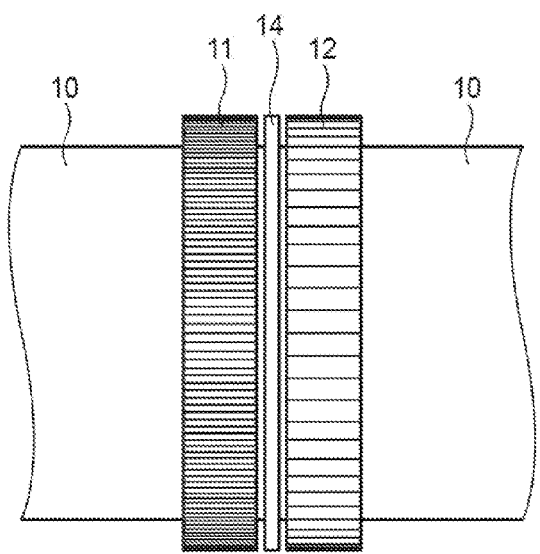
FIG. 3 is a side view illustrating a configuration of a modified example of the operation portion of the lens device in FIG. 2.

FIG. 2 illustrates an operation portion provided with the iris ring 11 and the ND filter ring 12 in the lens device 2 in an enlarged scale, and FIG. 3 illustrates a modified example of the operation portion.

In some cases, it may be convenient to operate the iris ring 11 and the ND filter ring 12 together to be rotated simultaneously in the same direction, and thus as illustrated in FIG. 2, the iris ring 11 and the ND filter ring 12 are arranged close to each other. However, the iris ring 11 and the ND filter ring 12 may be positioned to be spaced away from each other.

When the iris ring 11 and the ND filter ring 12 are arranged close to each other, it is desirable to provide a slight gap 13 between the iris ring 11 and the ND filter ring 12 such that, when only one ring is operated, the other ring is not rotated. Preferably, the distance of the gap 13 is set to be not more than a width of one finger (about 1.5 cm), in consideration of operability at the time of operating the iris ring 11 and the ND filter ring 12 together to be rotated simultaneously in the same direction. As illustrated in FIG. 3, a non-movable partition plate (diaphragm) 14 may be provided between the iris ring 11 and the ND filter ring 12. The non-movable partition plate 14 is an annular flange portion which is formed to protrude radially outward from outer periphery of the housing 10. The outer diameter of the partition plate 14 is preferably equal to or greater than the outer diameter of the iris ring 11 and the ND filter ring 12. Accordingly, when one ring is operated, the finger hardly comes in contact with the other ring, and thus both rings do not rotate at once.

The photographer 5 may operate the iris ring 11 and the ND filter ring 12 in distinction from each other when he/she knows which one of the iris ring 11 and the ND filter ring 12 is disposed at the photographic subject side, and which one is disposed at the photographer side.

As described above, the lens device 2 is configured to include the iris ring 11 as an operation tool of the diaphragm device, and the ND filter ring 12 as an operation tool of the light transmittance variable filter, in which both rings may be operated by the same operation such as turning with a finger.

In the lens device 2, in order to achieve the same operation feeling in the iris ring 11 and the ND filter ring 12, the correspondence relationship between an operation amount of the iris ring 11 and a change rate of an amount of transmitted light of the diaphragm device, and the correspondence relationship between an operation amount of the ND filter ring 12 and a change rate of an amount of transmitted light of the light transmittance variable filter are set to be the same. The operation amount of the iris ring 11 and the ND filter ring 12 refers to a turning angle at any position of each ring, and the position from the origin of each ring is referred to as a rotation angle.

Figure 4A:
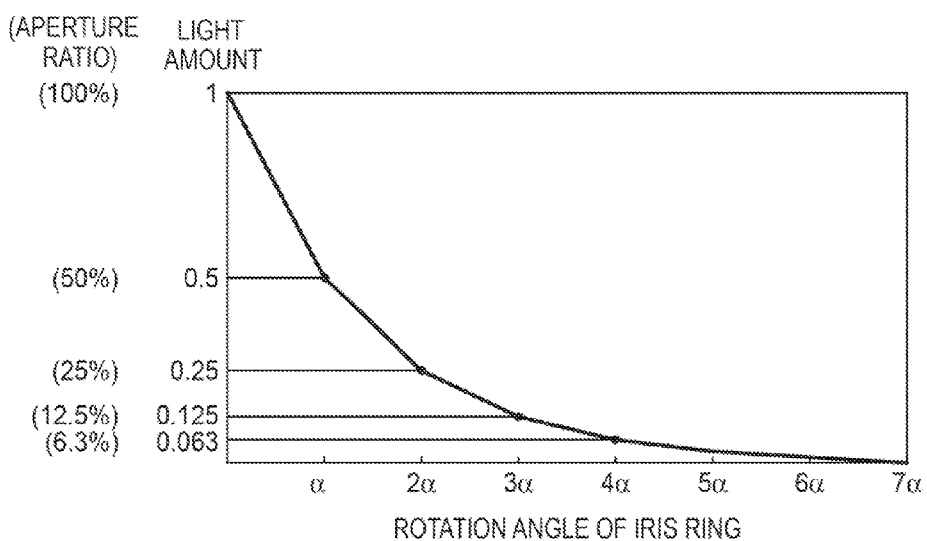
FIGS. 4A and 4B are graphs illustrating a relationship between a rotation angle of the iris ring illustrated in FIG. 2 and an amount of transmitted light of the diaphragm device, a relationship between a rotation angle of the ND filter ring illustrated in FIG. 2 and an amount of transmitted light of the light transmittance variable filter.
Figure 4B:
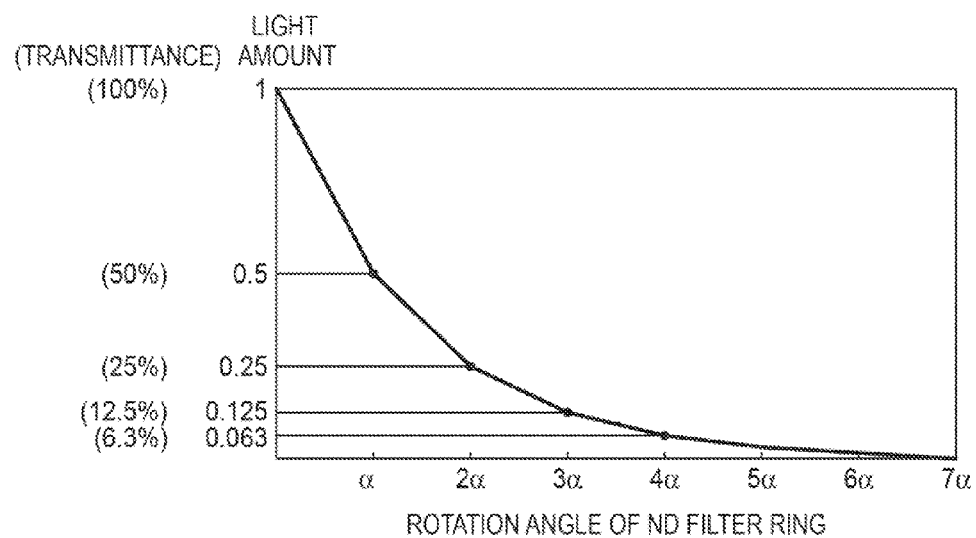

FIG. 4A illustrates an example of a relationship between a rotation angle of the iris ring 11 and an amount of transmitted light of the diaphragm device, and FIG. 4B illustrates an example of a relationship between a rotation angle of the ND filter ring 12 and an amount of transmitted light of the light transmittance variable filter. In each graph of FIGS. 4A and 4B, light amount points at respective operation amounts (turning angles) ($\alpha$) are connected by straight lines, but the same effects are achieved in correspondence of rotation angle-amount of transmitted light in which respective points are connected by curves.

When the position of the iris ring 11 where the diaphragm device is opened (aperture ratio 100%) is set as the origin, and the amount of transmitted light of the diaphragm device at the aperture ratio 100% is set as 1, the amount of transmitted light is set to be 0.5 (aperture ratio 50%) at a rotation angle ($\alpha$), 0.25 (aperture ratio 25%) at a rotation angle ($2\alpha$), 0.125 (aperture ratio 12.5%) at a rotation angle ($3\alpha$), 0.063 (aperture ratio 6.3%) at a rotation angle ($4\alpha$), etc.

Also, in the ND filter ring 12, in order to obtain the same operation feeling as that of the iris ring 11, the position of the ND filter ring 12 where the light transmittance variable filter has maximum transmittance (transmittance 100% in the illustrated example) is set as the origin, and an amount of transmitted light of the light transmittance variable filter at transmittance 100% is set as 1. Then, the amount of transmitted light is set to be 0.5 (transmittance 50%) at a rotation angle ($\alpha$), 0.25 (transmittance 25%) at a rotation angle ($2\alpha$), 0.125 (transmittance 12.5%) at a rotation angle ($3\alpha$), and 0.063 (transmittance 6.3%) at a rotation angle ($4\alpha$).

That is, both the relationship between the rotation angle of the iris ring 11 and the amount of transmitted light of the diaphragm device, and the relationship between the rotation angle of the ND filter ring 12 and the amount of transmitted light of the light transmittance variable filter are set to be geometric sequences with the same common ratio (1/2) in which a unit variation of the rotation angle is set as $\alpha$, and the amount of transmitted light is 1, 0.5, 0.25, 0.125, ... at each rotation angle (origin, $\alpha$, $2\alpha$, ...)

For example, as disclosed in Patent Literature 2, when the amount of transmitted light of the light transmittance variable filter is adjusted by a voltage value applied to the filter, a control voltage value is determined according to the rotation angle ($\alpha$, $2\alpha$, $3\alpha$, ...) of the ND filter ring 12, and is applied to the electrodes of the light transmittance variable filter so as to implement the amount of transmitted light corresponding to the rotation angle.

In the above-described configurations, for example, in a state where the iris ring 11 and the ND filter ring 12 are positioned at any position, an amount of transmitted light may be reduced by half in any one of a case of operating the iris ring 11 to be rotated by an operation amount ($\alpha$) in a direction of reducing the aperture ratio of the diaphragm device, a case of operating the ND filter ring 12 to be rotated by an operation amount ($\alpha$) in a direction of reducing the transmittance of the light transmittance variable filter. Thus, the same operation feelings may be obtained in the iris ring 11 and the ND filter ring 12.

Furthermore, the amount of transmitted light of the light transmittance variable filter is subjected to a feedback control as described below such that the relationship between the rotation angle of the ND filter ring 12 and the amount of transmitted light of the light transmittance variable filter, and the relationship between the rotation angle of the iris ring 11 and the amount of transmitted light of the diaphragm device coincide with high accuracy.

Figure 5:
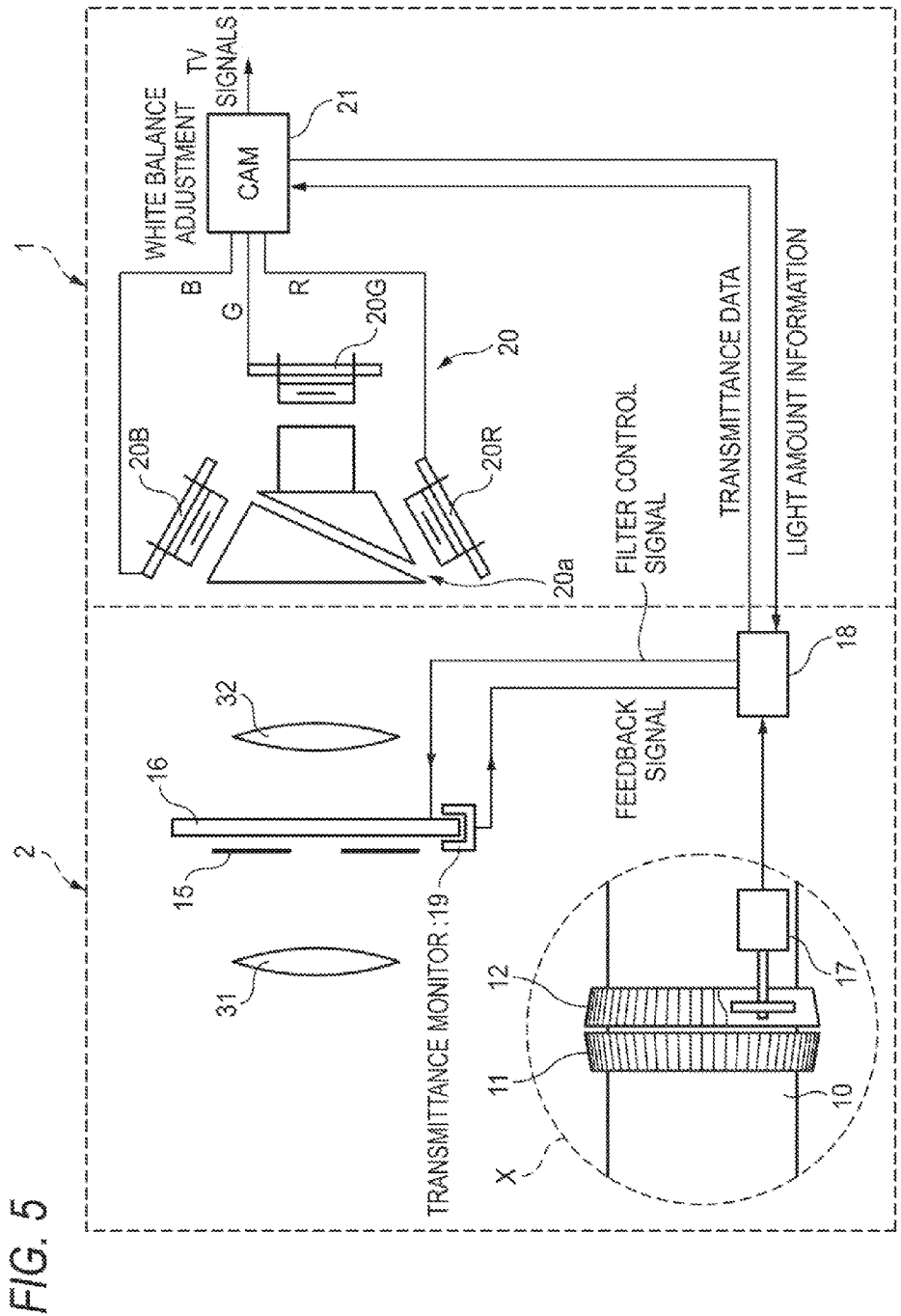
FIG. 5 is a functional block diagram of a main part of the image capturing apparatus illustrated in FIG. 1.

FIG. 5 illustrates functional blocks of a main part of the image capturing apparatus when the lens device 2 is mounted on the image capturing apparatus body 1.

Figure 32:
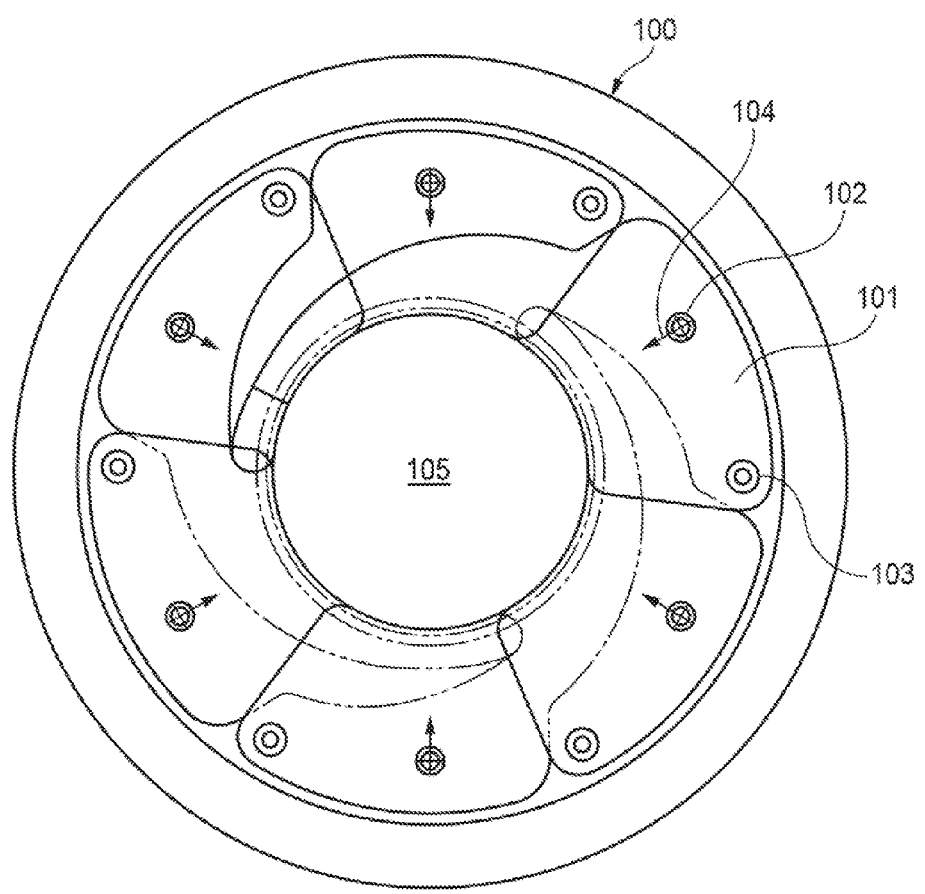
FIG. 32 is a plan view illustrating an example of a general diaphragm device configured to narrow an aperture area.

In the lens device 2, photographing lenses 31 and 32, a diaphragm device 15 configured to expand and contract the aperture area exemplified in FIG. 32, a light transmittance variable filter 16, and an ND filter control unit 18 are incorporated. In this example, the diaphragm device 15 and the light transmittance variable filter 16 are arranged close to each other.

The dashed-line circle X illustrated in FIG. 5 indicates the outer periphery of the housing 10 of the lens device 2, within which the photographing lenses 31 and 32, the diaphragm device 15, and the light transmittance variable filter 16 are accommodated. The rotation amount of the iris ring 11 is converted into a driving force for driving the blades 101 in the direction of arrows 104 (or in the reverse direction) illustrated in FIG. 32, in the diaphragm device 15 by a mechanical or electrical driving mechanism.

A potentiometer 17 configured to detect a rotation angle of the ND filter ring 12 is provided on the inner periphery of the ND filter ring 12. The ND filter control unit 18 reads the rotation angle detected by the potentiometer 17, and applies a voltage value according to the rotation angle to the electrodes of the light transmittance variable filter 16 to adjust the amount of transmitted light of the light transmittance variable filter 16.

A transmittance monitor 19 is disposed in the vicinity of the light transmittance variable filter 16. The transmittance detected by the transmittance monitor 19 is fed back to the ND filter control unit 18. The ND filter control unit 18 controls the transmittance of the light transmittance variable filter 16 such that the amount of transmitted light of the light transmittance variable filter 16 reaches an amount of transmitted light according to the rotation angle detected by the potentiometer 17.

The transmittance monitor 19 is constituted by a light emitting element and a light receiving element between which a disc of the light transmittance variable filter 16 is interposed, and is configured to detect the transmittance of the light transmittance variable filter 16 from a light amount emitted from the light emitting element and a light amount received by the light receiving element.

In the example illustrated in FIG. 5, an image capturing element module 20 and a camera image processing unit (CAM) 21 are incorporated in the image capturing apparatus body 1. The image capturing element module 20 includes a prism 20a configured to separate incident light transmitted through the lens device 2 into three color lights of red (R), green (G), and blue (B), an image capturing element 20R configured to detect red light (R light) separated from the prism 20a, an image capturing element 20G configured to detect green light (G light) separated from the prism 20a, and an image capturing element 20B configured to detect blue light (B light) separated from the prism 20a.

Signals detected by the respective image capturing elements 20R, 20G and 20B are subjected to white balance correction in the camera image processing unit 21, and output as, for example, television signals.

The camera image processing unit 21 feeds image signals photographed by the image capturing element module 20, as light amount information, back to the ND filter control unit 18 of the lens device 2. The ND filter control unit 18 controls the transmittance of the light transmittance variable filter 16 taking the information into consideration as well.

When the transmittance is varied in the light transmittance variable filter 16, the RGB balance of transmitted light (incident light on image capturing elements) may be changed. Thus, the camera image processing unit 21 receives transmittance information from the ND filter control unit 18, and performs white balance correction by using the transmittance information. The white balance correction using the transmittance information will be described below.

Figure 6:
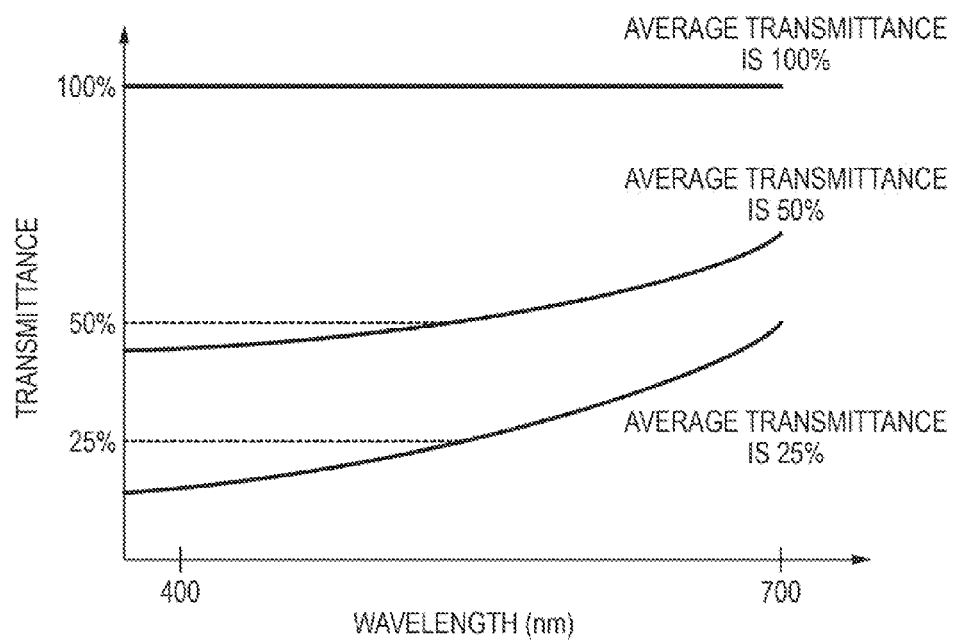
FIG. 6 is a graph illustrating an example of a relationship between a change of a transmittance of a light transmittance variable filter and a transmitted light wavelength region.
Figure 7A:
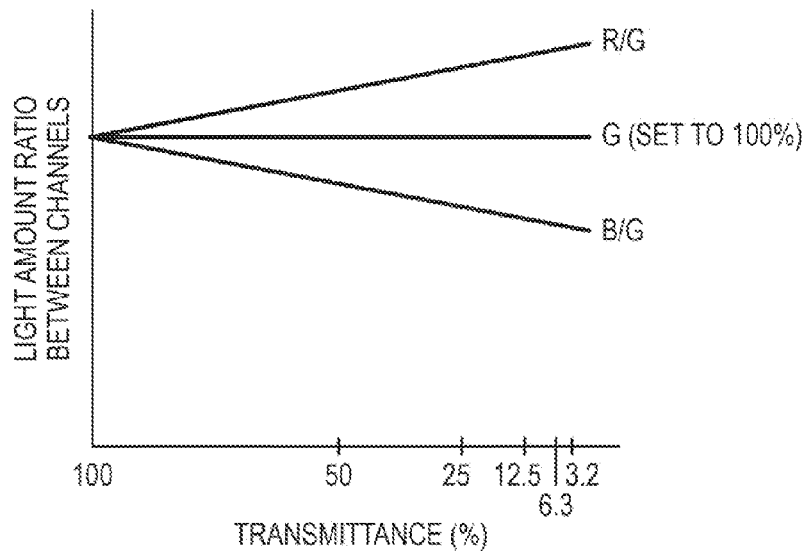
FIGS. 7A and 7B are graphs illustrating an example of a transmittance and a change of color balance of RGB in the characteristic of the light transmittance variable filter illustrated in FIG. 6.
Figure 7B:
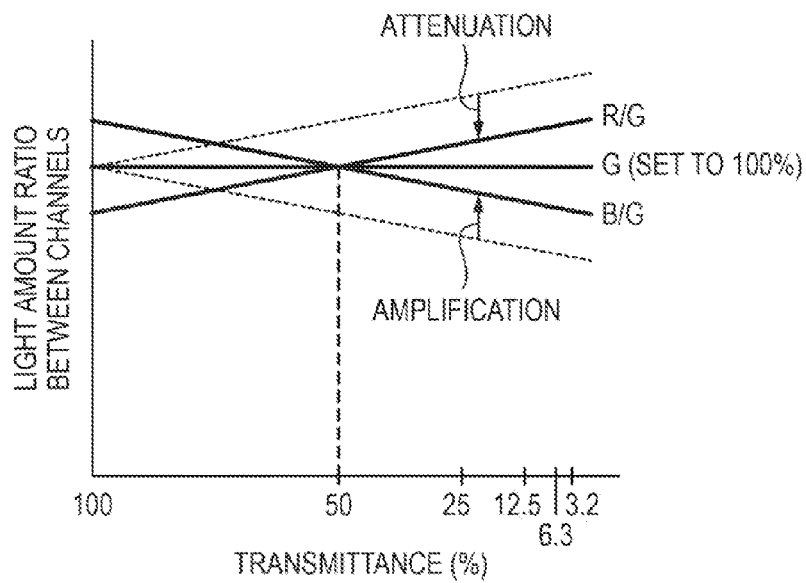

FIG. 6 illustrates an example of a characteristic of a light transmittance variable filter, and FIGS. 7A and 7B illustrate an example of a transmittance of the light transmittance variable filter and a change of color balance of RGB.

Even though the characteristic of the light transmittance variable filter 16 is flat when the average transmittance of incident light at a wavelength range of 400 nm (blue) to 700 nm (red) is 100%, light reduction is not evenly made but its variation occurs in respective wavelength regions according to variation of the transmittance.

In the example illustrated in FIG. 6, when the transmittance is 50%, the light reduction amount in the region of red light (R) becomes smaller than that in the region of G, and the light reduction amount in the region of blue light (B) becomes larger than that in the region of G. Further, when the transmittance is 25%, the light reduction amount in the region of R becomes smaller than that in the region of G as compared to the case when the transmittance is 50%, and the light reduction amount in the region of B becomes larger than that in the region of G as compared to the case when the transmittance is 50%.

When this phenomenon is represented by a graph in which the horizontal axis indicates transmittance and the vertical axis indicates light amount ratio, the light amounts of respective channels of RGB equally become 100% by obtaining a white balance in a state where the transmittance of the light transmittance variable filter 16 is 100%. When the light reduction amount of the light transmittance variable filter 16 is increased, the light amount ratio R/G between channels is increased and the light amount ratio B/G is decreased according to the increase of the light reduction amount (FIG. 7A).

In a case where the light transmittance variable filter 16 having the above-described characteristics is used, when the transmittance of the light transmittance variable filter 16 is changed from 100% to 50%, the RGB balance is collapsed and a white photographic subject is output in a reddish white color. When the camera image processing unit 21 corrects the RGB balance collapsed by the change of the transmittance, based on transmittance information obtained from the ND filter control unit 18 and a correction amount determined in advance according to the transmittance information, a white photographic subject may be output in the color despite a change of the transmittance of the light transmittance variable filter 16.

For example, the camera image processing unit 21 performs a correction by attenuating an R output and amplifying a B output (FIG. 7B). The correction amount set in advance according to the transmittance information may be obtained by photographing a white photographic subject under a certain light source while changing the transmittance of the light transmittance variable filter 16, measuring a collapse amount of RGB balance, and obtaining a correction value for compensating the collapse amount according to a change of the transmittance.

In the example illustrated in FIG. 5, the image capturing element to be mounted in the image capturing apparatus body 1 is a three-plate type image capturing element, but may be a single-plate type image capturing element.

Figure 8:
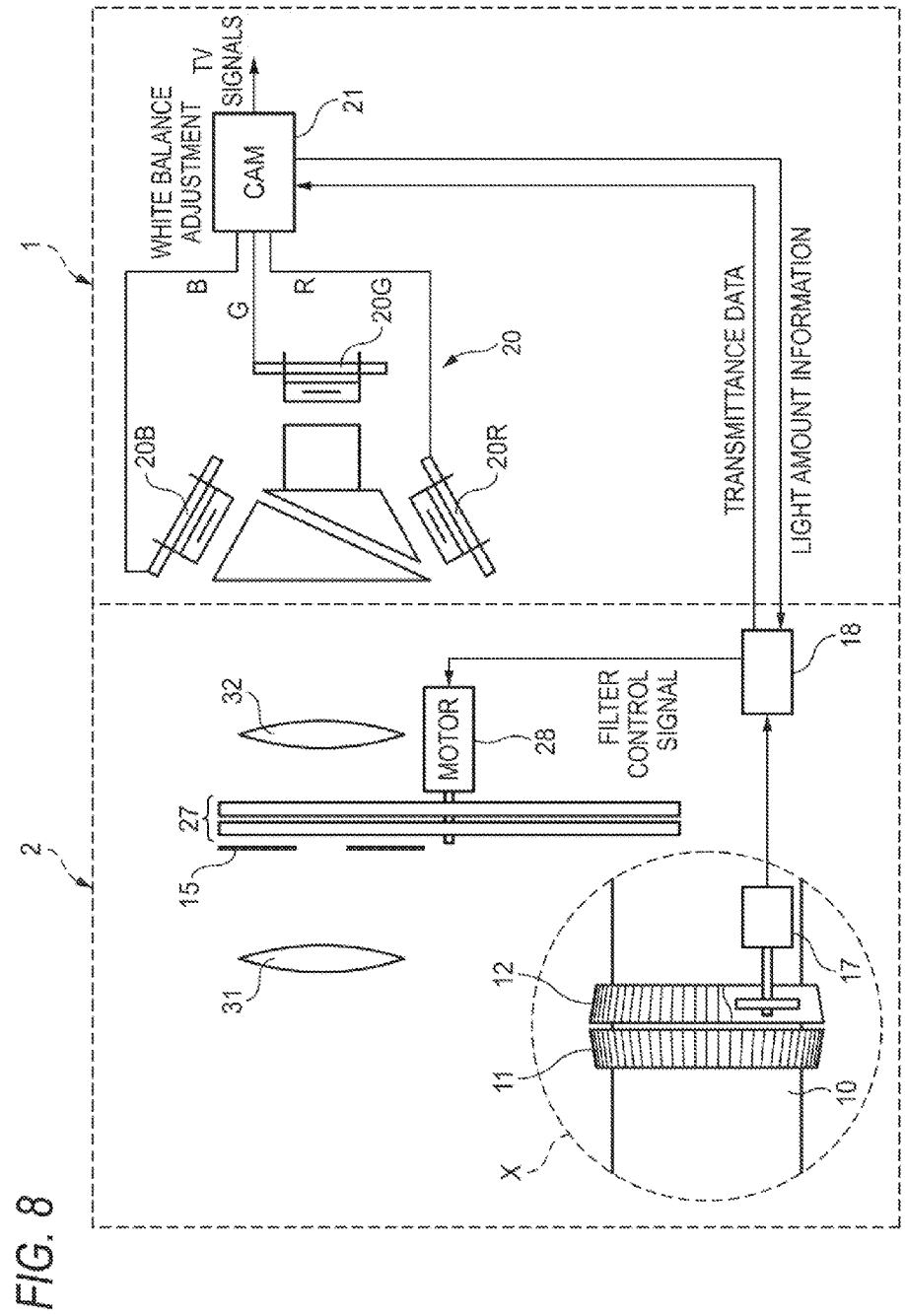
FIG. 8 is a functional block diagram of a main part of a modified example of the image capturing apparatus illustrated in FIG. 1.

FIG. 8 illustrates functional blocks of a main part of another example of the image capturing apparatus.

In the example illustrated in FIG. 8, as a light transmittance variable filter 27, the filter disclosed in Patent Literature 1 is used. In the filter, gradation is formed by using a light reduction material on a transparent disc. That is, the filter is manufactured by adjusting the density of the light reduction material in such a manner that the transmittance is gradually increased according to an increase of a rotation angle with respect to the center axis so that the transmittance becomes 0% at a rotation angle 0° and the transmittance becomes 100% at a position just before a rotation angle 360.

The filter 27 is incorporated in the lens device 2, together with the diaphragm device 15. The ND filter control unit 18 sends a command to a motor 28 according to a rotation angle detected by the potentiometer 17 to control a rotation angle position of the filter 27. Accordingly, a gradation density that comes to an incident optical path of the filter 27 becomes a required density, and corresponds to an amount of transmitted light of a filter according to rotational position of the ND filter ring 12. In the configuration, the gradation position of the filter 27 is determined by the rotation angle of the filter 27. Thus, the feedback control system by the transmittance monitor 19 of FIG. 5 may not be provided.

Figure 9:
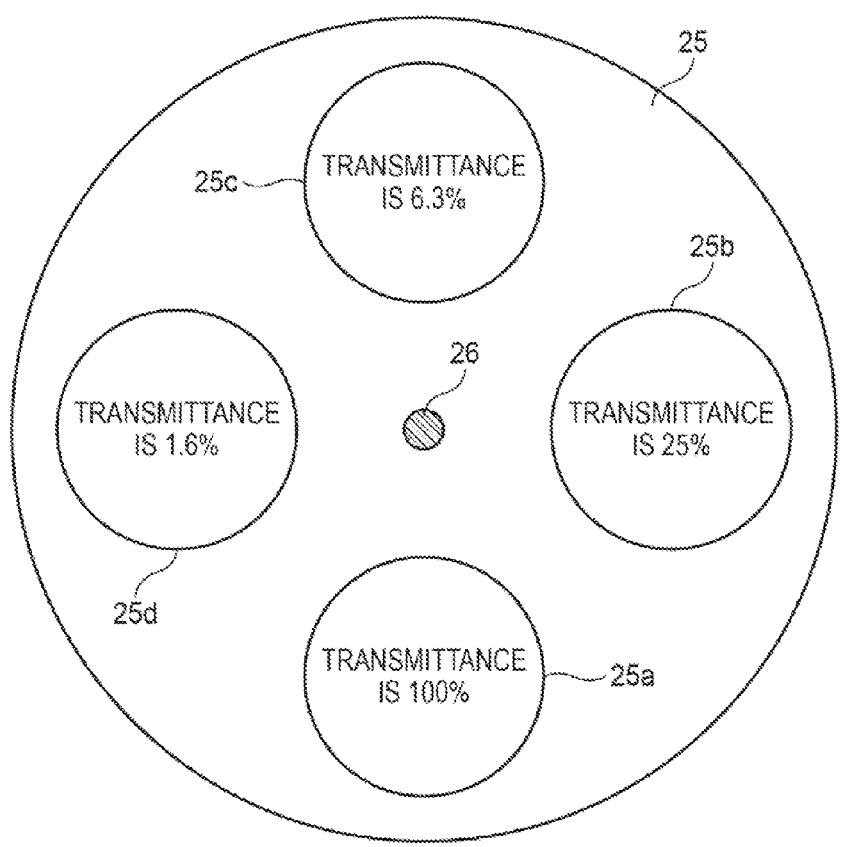
FIG. 9 is a plan view illustrating another light transmittance variable filter that replaces the light transmittance variable filter in the image capturing apparatus in FIG. 8.

As for the light transmittance variable filter 27, instead of the light transmittance variable filter disclosed in Patent Literature 1, the filter exemplified in FIG. 9 may be used. In the filter illustrated in FIG. 9, four transmissive portions 25a, 25b, 25c, and 25d are formed, for example, on one disc 25, and the transmissive portion 25a is formed by a simple "through hole." That is, the transmissive portion 25a has a transmittance 100%.

In the transmissive portion 25b, for example, an ND filter having a transmittance 25% is fitted. In the transmissive portion 25c, for example, an ND filter having a transmittance 6.3% is fitted. In the transmissive portion 25d, for example, an ND filter having a transmittance 1.6% is fitted. The light transmittance variable filter is rotationally driven by the motor 28 around a center axis 26 such that a corresponding transmissive portion 25a, 25b, 25c, or 25d is moved to and disposed on an optical axis of the lens device 2.

Figure 10:
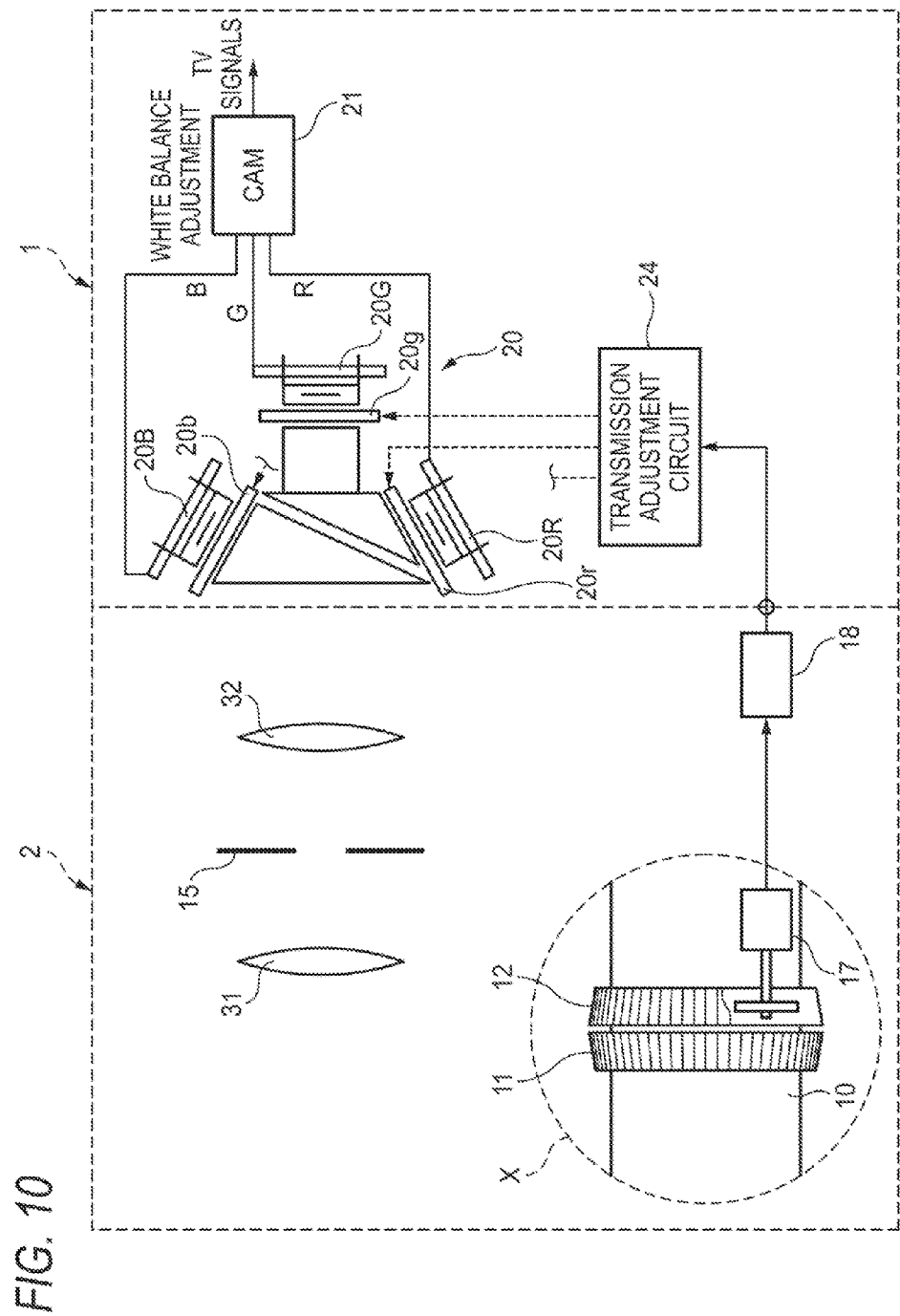
FIG. 10 illustrates a functional block diagram of a main part of a modified example of the image capturing apparatus illustrated in FIG. 1.

FIG. 10 illustrates functional blocks of a main part of another example of the image capturing apparatus.

In the example illustrated in FIG. 10, light transmittance variable filters are incorporated in the image capturing apparatus body 1 to be attached to image capturing elements. In the image capturing apparatus body 1, image capturing elements 20R, 20G, and 20B, light transmittance variable filters 20r, 20g and 20b provided at front ends of the respective image capturing elements, and a transmission adjustment circuit 24 configured to adjust amounts of transmitted light of the light transmittance variable filters 20r, 20g, and 20b are incorporated.

To the ND filter ring 12, a potentiometer 17 configured to detect the rotation angle of the ND filter ring 12 is attached. An ND filter control unit 18 is configured to transfer the detection value of the potentiometer 17 to the transmission adjustment circuit 24 at the image capturing apparatus body 1 side. The transmission adjustment circuit 24 controls a transmittance of each of the light transmittance variable filters 20r, 20g and 20b according to the detection value of the potentiometer 17.

Meanwhile, in the example illustrated in FIG. 10, the light transmittance variable filter may also be incorporated in the lens device 2 as in the example illustrated in FIG. 5 or 8. In this case, in the configuration, the use of the light transmittance variable filter at the image capturing apparatus body 1 side or the use of the light transmittance variable filter incorporated in the lens device 2 may be selected by a switch (not illustrated) provided in the lens device 2. When the light transmittance variable filter incorporated in the lens device 2 is not used, the ND filter control unit 18 may be configured to set the transmittance of the light transmittance variable filter to be 100%, and to simply transfer the detection value of the potentiometer 17 to the image capturing apparatus body 1 side.

Figure 11:
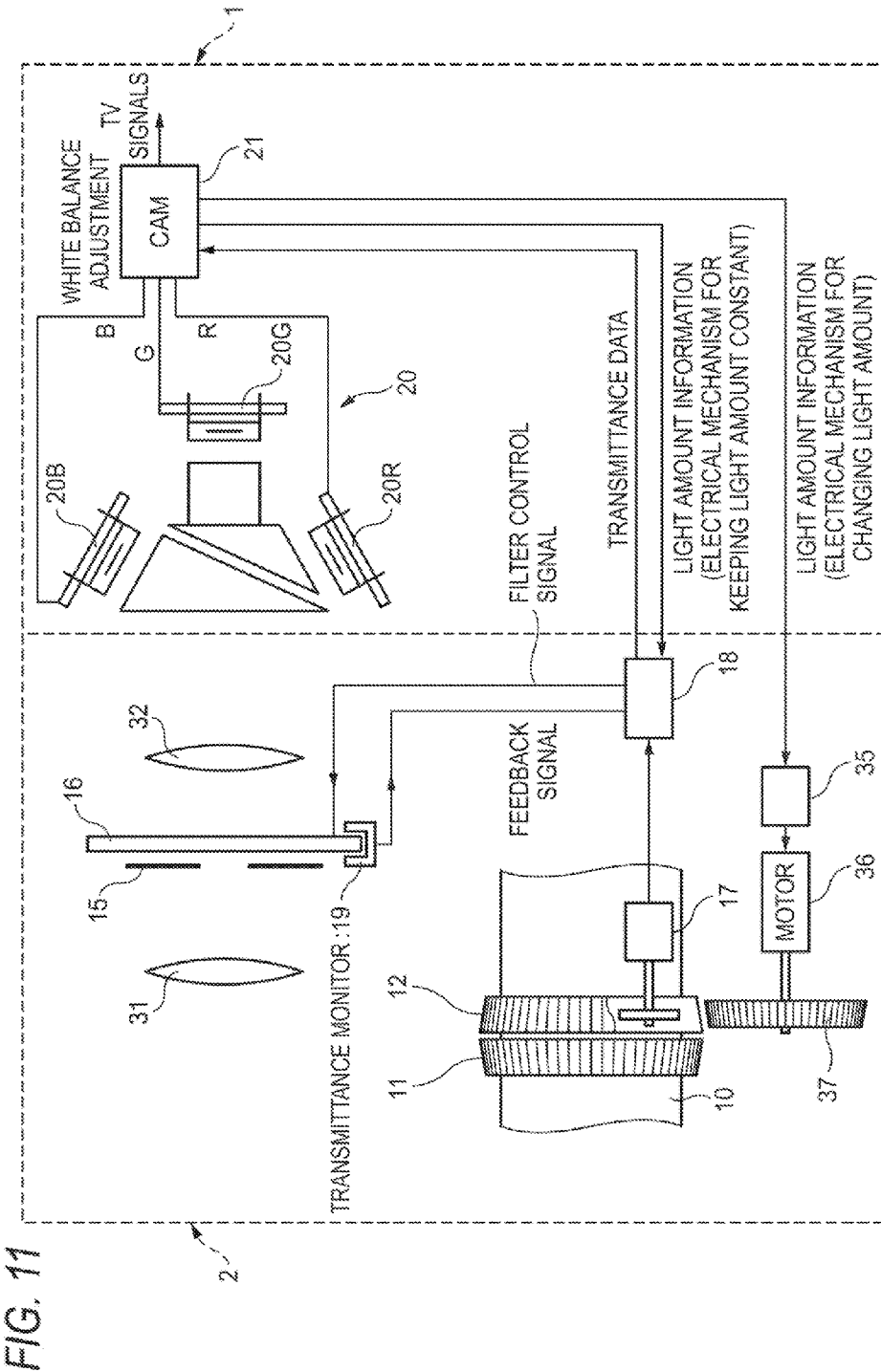
FIG. 11 illustrates a functional block diagram of a main part of a modified example of the image capturing apparatus illustrated in FIG. 1.

FIG. 11 illustrates functional blocks of a main part of a modified example of the image capturing apparatus.

In the example illustrated in FIG. 5, the camera image processing unit 21 at the image capturing apparatus body 1 side feeds the light amount information back only to the ND filter control unit 18 at the lens device 2 side. In contrast, in the example illustrated in FIG. 11, the camera image processing unit 21 further feeds the light amount information back to a motor driver 35 incorporated in the lens device 2. The motor driver 35 drives a motor 36 based on the fed-back light amount information. The motor 36 rotationally drives the ND filter ring 12 by using a gear 37 meshing with the ND filter ring 12 so as to adjust the amount of transmitted light of the light transmittance variable filter 16.

In the configuration illustrated in FIG. 11, it is possible to realize a mode in which the diaphragm device is manually operated by the iris ring 11, and the light transmittance variable filter is automatically controlled. Thus, the diaphragm device and the light transmittance variable filter may be used in distinction from each other according to situations. Also, in the iris ring 11, the same type of motor drive mechanism may be provided such that the diaphragm device and the light transmittance variable filter are automatically controlled.

Although an example in which the light transmittance variable filter is incorporated in the lens device 2 (FIGS. 5, 8 and 11) and an example in which the light transmittance variable filter is incorporated in the image capturing apparatus body 1 (FIG. 10) have been described above, the light transmittance variable filter may be disposed at any position between a position of a photographic subject side front end of the lens device 2 and an image capturing element of the image capturing apparatus body 1. That is, the disposition position of the light transmittance variable filter is not limited by the disposition position of the diaphragm device 15, or the ND filter ring 12. Although it has been assumed that the image capturing apparatus body 1 is a separate member from the lens device 2, they may be integrated with each other.

According to the above described lens device 2, a photographer who is photographing a photographic subject moving image by a television camera or a video camera may perform various exposure controls through combination of adjustment of an amount of transmitted light of the diaphragm device and adjustment of an amount of transmitted light of the light transmittance variable filter. Thus, the photographer may photograph images according to various photographing intentions.

Furthermore, the iris ring 11 configured to adjust an amount of transmitted light of the diaphragm device and the ND filter ring 12 configured to adjust an amount of transmitted light of the light transmittance variable filter are set to have the same operation feeling. Thus, both the rings may be operated by the same operation feeling, and thus, exposure adjustment may be performed intuitively and instantly by relying on only the touch of a finger. This reduces an operation load and allows the photographing intention to be instantly reflected on an image.

FIGS. 12 to 21 are views for explaining an exemplary embodiment of the present invention which illustrate configurations of other examples of the lens device, respectively. The lens device illustrated in FIGS. 12 to 21 is different from the above-described lens device 2 in the configuration of an operation portion provided with the iris ring and the ND filter ring, but other configurations of the lens device are the same as those of the lens device 2. Thus, configurations other than the operation portion are not illustrated, and elements common to those of the above-described lens device 2 are given common numerals, and the description thereof is omitted or summarized.

In the above-described lens device 2, the photographer 5 may operate the iris ring 11 and the ND filter ring 12 arranged close to each other in distinction from each other when the photographer 5 knows which one of the iris ring 11 and the ND filter ring 12 is disposed at the photographic subject side and which one is disposed at the front side. However, the photographer 5 operates the iris ring 11 and the ND filter ring 12 while looking into the finder device 6. Thus, it is desirable that the photographer is allowed to reliably determine which ring is operated only with the touch of the fingertip. Accordingly, in the lens device to be described later, the iris ring 11 and the ND filter ring 12 are differentiated from each other by surface structures thereof.

Figure 12:
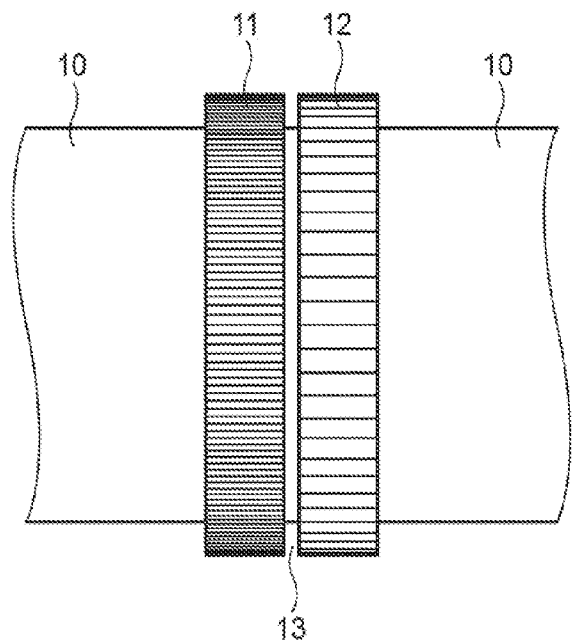
FIG. 12 is a side view for explaining an exemplary embodiment of the present invention which illustrates a configuration of another example of the operation portion provided with the operation tool of the diaphragm device and the operation tool of the light transmittance variable filter in the lens device.

In the example illustrated in FIG. 12, the outer peripheral surfaces of the iris ring 11 and the ND filter ring 12 are knurled (anti-slip processed), and the rings 11 and 12 have different intervals of knurled grooves (extending in the lens optical axis direction of the lens device 2). For example, the knurled groove interval of the ring 11 is fine and the knurled groove interval of the ring 12 is sparse. Accordingly, it is possible to distinguish the rings 11 and 12 from each other only with the touch of a finger.

Figure 13:
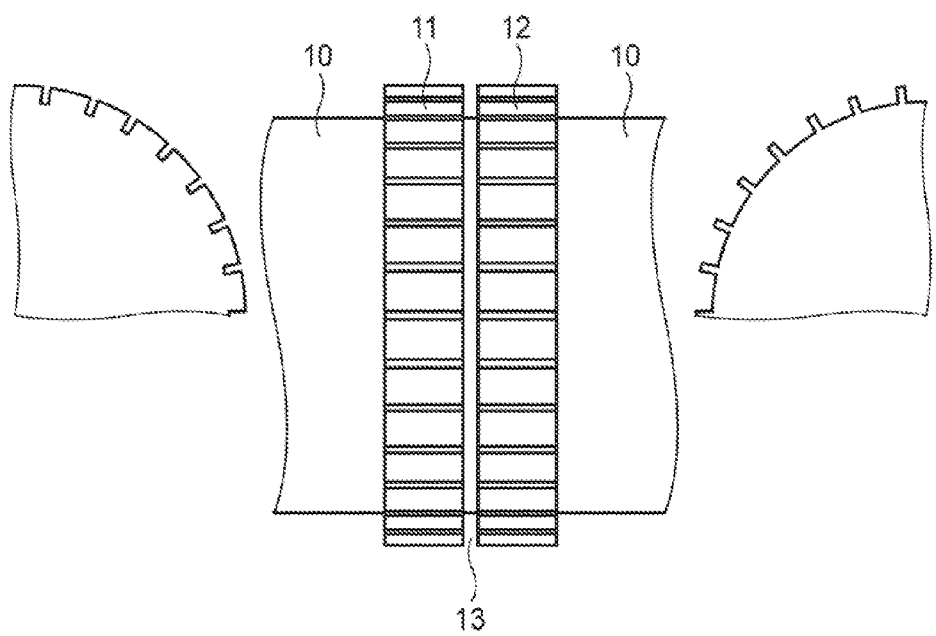
FIG. 13 is a side view illustrating a configuration of another modified example of the operation portion of the lens device in FIG. 12.

In the example illustrated in FIG. 13, the outer peripheral surfaces of the rings 11 and 12 are formed with irregularities in the circumferential direction. On the cross-sections illustrated at left and right ends of FIG. 13, in the ring 11, the circumferential width of the recesses is narrower than the circumferential width of the protrusions, and in the ring 12, on the contrary, the circumferential width of the recesses is wider than the circumferential width of the protrusions. Accordingly, it is possible to distinguish the rings 11 and 12 from each other only with the touch of a finger.

Figure 14:
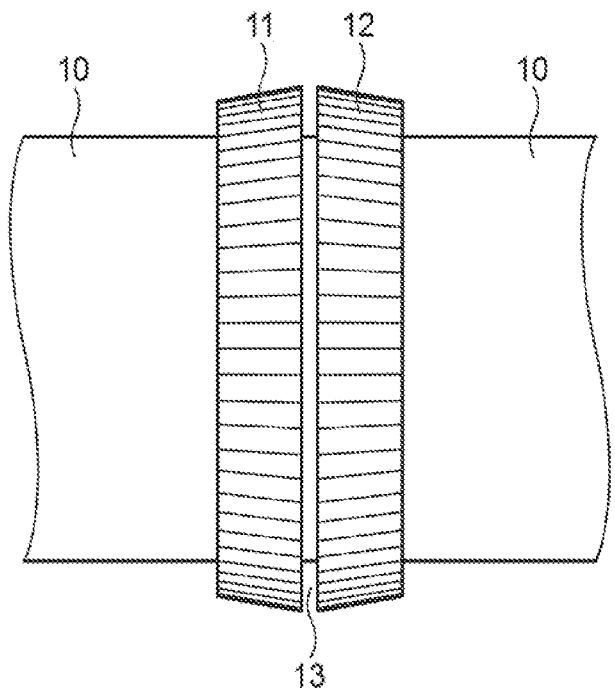
FIG. 14 is a side view illustrating a configuration of another modified example of the operation portion of the lens device in FIG. 12.

In the example illustrated in FIG. 14, the rings 11 and 12 have knurled outer peripheral surfaces at inclination angles. The outer peripheral surface of the ring 11 is inclined to have a diameter increasing toward the image capturing apparatus body 1 side. The outer peripheral surface of the ring 12 is inclined to have a diameter decreasing toward the image capturing apparatus body 1. The diameters at the ends where the rings 11 and 12 face each other are the same. Even with such a difference in the surface structure, the photographer 5 may distinguish the rings 11 and 12 from each other only with the sense of a fingertip.

Figure 15:
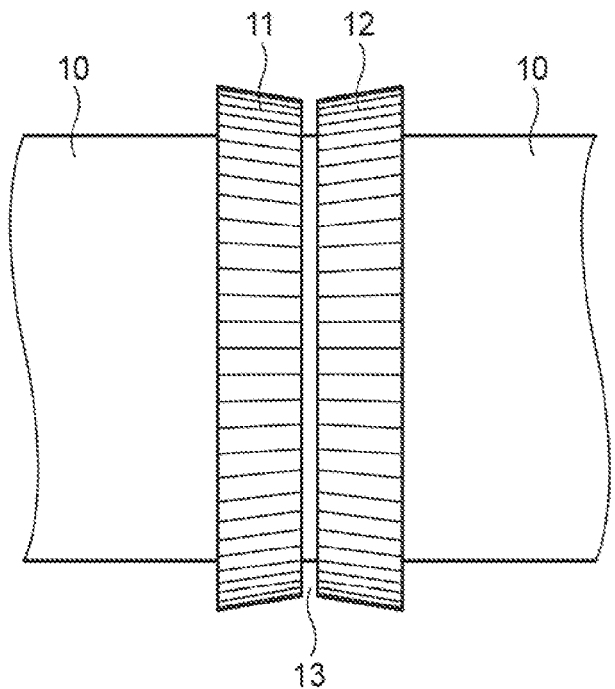
FIG. 15 is a side view illustrating a configuration of another modified example of the operation portion of the lens device in FIG. 12.

In the example illustrated in FIG. 15, the rings 11 and 12 have outer peripheral surfaces at inclination angles in the reverse direction to that of the example illustrated in FIG. 14. Even with such a difference in the surface structure, the photographer 5 may distinguish the rings 11 and 12 from each other only with the sense of a fingertip.

Figure 16:
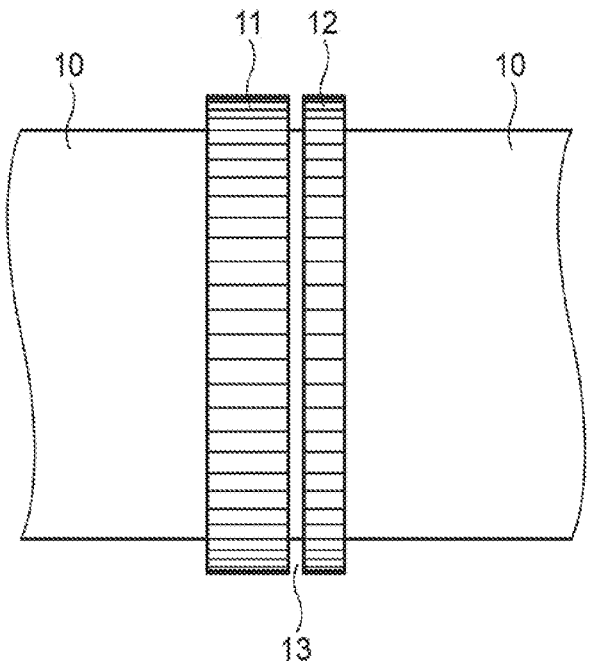
FIG. 16 is a side view illustrating a configuration of another modified example of the operation portion of the lens device in FIG. 12.

In the example illustrated in FIG. 16, the rings 11 and 12 are different from each other in the width of the outer peripheral surface, in which the width of the ring 11 is wider and the width of the ring 12 is narrower. Of course, the width of the ring 11 may be narrower and the width of the ring 12 may be wider. Even with such a difference in the surface structure, the photographer may distinguish the rings 11 and 12 from each other only with the sense of a fingertip.

Figure 17:
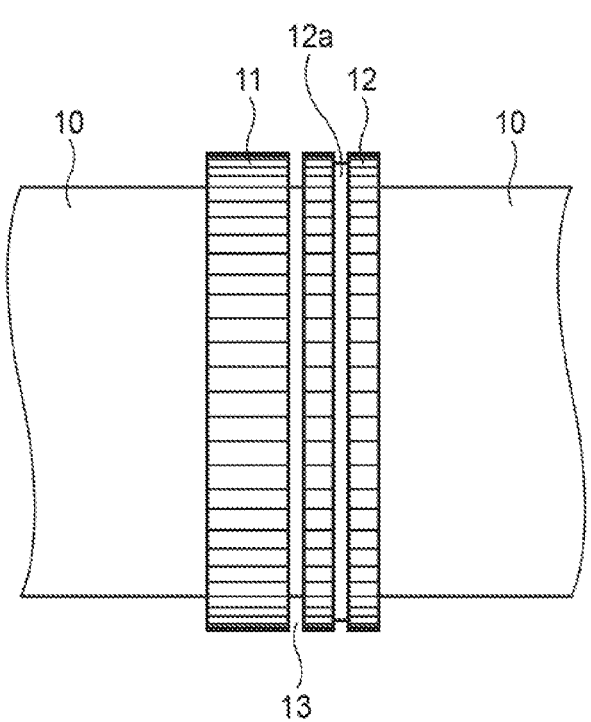
FIG. 17 is a side view illustrating a configuration of another modified example of the operation portion of the lens device in FIG. 12.

In the example illustrated in FIG. 17, knurled outer peripheral surfaces of the rings 11 and 12 have the same width, but a notch 12a extending in the circumferential direction is placed in the knurling of the outer peripheral surface of the ring 12. By the notch 12a, the knurled surface of the ring 12 is divided into two portions in the optical axis direction of the lens device 2, and thus, there is a difference in the number of divisions of the knurled surface between the rings 11 and 12 (the division number of the ring 11: "1", the division number of the ring 12: "2"). Of course, the knurled surface of the ring 11 may be divided into plural portions. Even with such a difference in the surface structure, the photographer 5 may distinguish the rings 11 and 12 from each other only with the sense of a fingertip.

Figure 18:
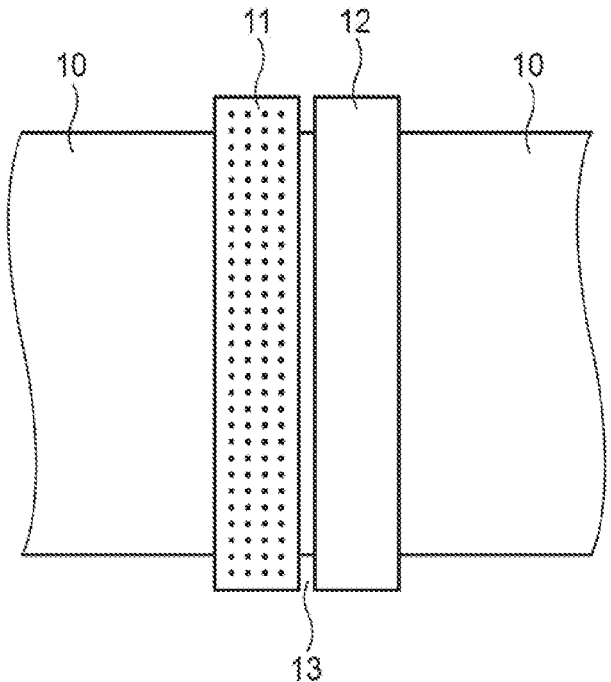
FIG. 18 is a side view illustrating a configuration of another modified example of the operation portion of the lens device in FIG. 12.

In the example illustrated in FIG. 18, only one surface (in the illustrated example, the ring 11 side) of the outer peripheral surfaces of the rings 11 and 12 is roughened through a surface-roughening process. The outer peripheral surface of the other ring has a smooth surface as it is without being subjected to the surface-roughening process. Even with such a difference in the surface structure, the photographer may distinguish the rings 11 and 12 from each other only with the sense of a fingertip.

Figure 19:
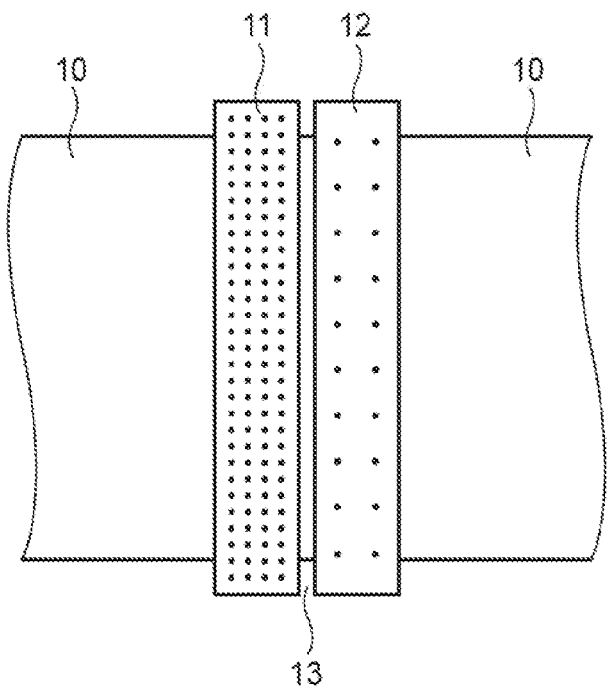
FIG. 19 is a side view illustrating a configuration of another modified example of the operation portion of the lens device in FIG. 12.

In the example illustrated in FIG. 19, both the outer peripheral surfaces of the rings 11 and 12 are roughened through a surface-roughening process. One (in the illustrated example, the ring 12 side) of the rings 11 and 12 has a small surface roughness, and the other has a large surface roughness. Even with such a difference in the surface structure, the photographer 5 may distinguish the rings 11 and 12 from each other only with the sense of a fingertip.

Figure 20:
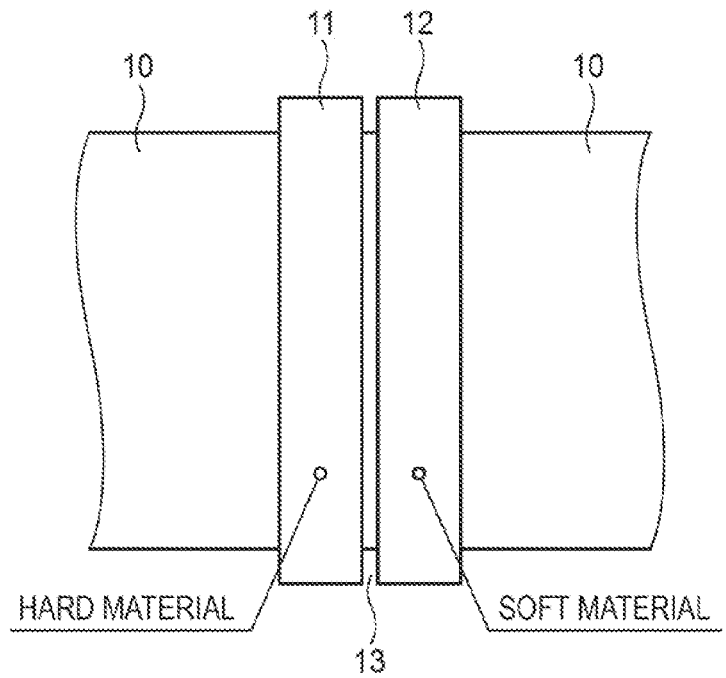
FIG. 20 is a side view illustrating a configuration of another modified example of the operation portion of the lens device in FIG. 12.

In the example illustrated in FIG. 20, one ring (for example, the ring 11) has an outer peripheral surface made of a hard material. The other ring has an outer peripheral surface made of a soft material (e.g., a rubber material). Even with such a difference in the surface structure, the photographer 5 may distinguish the rings 11 and 12 from each other only with the sense of a fingertip.

Figure 21:
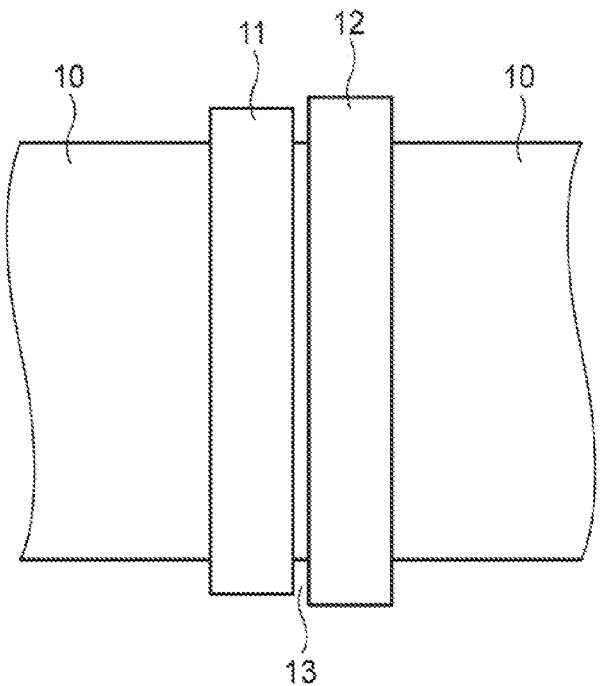
FIG. 21 is a side view illustrating a configuration of another modified example of the operation portion of the lens device in FIG. 12.

In the examples illustrated in FIGS. 12 to 20, the ring 11 and the ring 12 have the same diameter, but in the example illustrated in FIG. 21, the ring 11 and the ring 12 have different diameters. In the illustrated example, the outer diameter of the ring 11 is smaller than the outer diameter of the ring 12. Even with such a difference in the surface structure, the photographer 5 may distinguish the rings 11 and 12 from each other only with the sense of a fingertip.

With reference to FIGS. 12 to 21, the various differences in the surface structure between the iris ring 11 and the ND filter ring 12 have been described, but the rings 11 and 12 may be configured by employing any one difference in the surface structure, or by employing a plurality of differences in the surface structure in combination. For example, in the example illustrated in FIG. 12 where the rings 11 and 12 have different knurled groove intervals, the rings 11 and 12 may have different slopes of knurled surfaces (see FIGS. 14, and 15), and the knurled surface of the ring 12 may be formed with the notch 12a (see FIG. 17).

In the examples illustrated in FIGS. 12 to 21, the slight gap 13 is placed between the rings 11 and 12 disposed close to each other such that, when only one ring is operated, the other ring is not rotated by a frictional force. However, the non-movable cylindrical partition plate 14 (see FIG. 3) may be provided within the gap 13. Due to the partition plate 14, when only one ring of the rings 11 and 12 is operated, the other ring is hardly rotated, thereby improving usability.

The above-described various differences in the surface structure between the iris ring 11 and the ND filter ring 12 may be employed in the operation portion of the lens device in the image capturing apparatus illustrated in FIGS. 5, 8, 10, and 11. When the ND filter ring 12 is rotationally driven by a motor drive mechanism as in the image capturing apparatus illustrated in FIG. 11, or the iris ring 11 and the ND filter ring 12 are rotationally driven by a motor drive mechanism, a configuration where the knurled groove as a periphery gear is meshed with the motor may be appropriately employed. In this case, in order for the motor drive mechanism for the ring 11 and the motor drive mechanism for the ring 12 to share components, it is desirable that the rings 11 and 12 have the same knurled groove interval. Here, as for the difference in the surface structure between the rings 11 and 12, for example, a structural difference, for example, in the slope as illustrated in FIGS. 14 and 15, in width as illustrated in FIG. 16, or in division by notch illustrated in FIG. 17 may be employed.

Figure 22A:
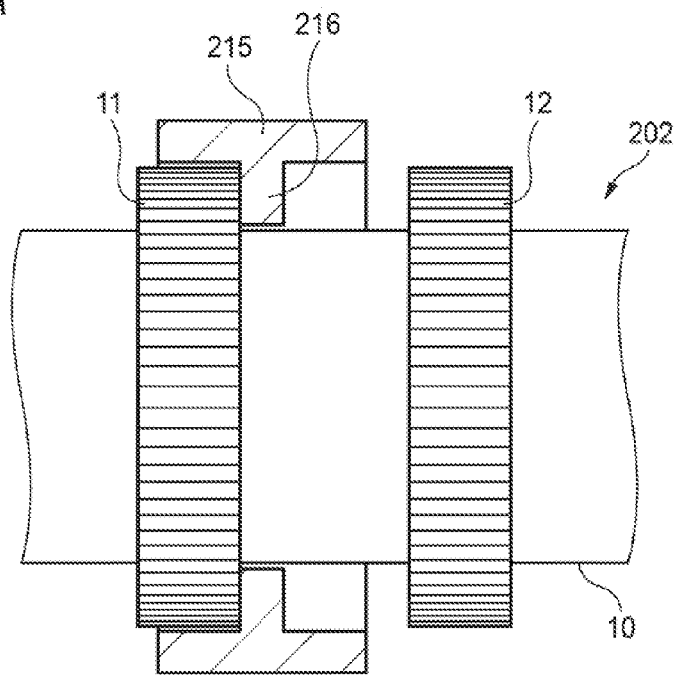
FIGS. 22A and 22B are side views for explaining an exemplary embodiment of the present invention which illustrate a configuration of another example of the operation portion provided with the operation tool of the diaphragm device and the operation tool of the light transmittance variable filter in the lens device.
Figure 22B:
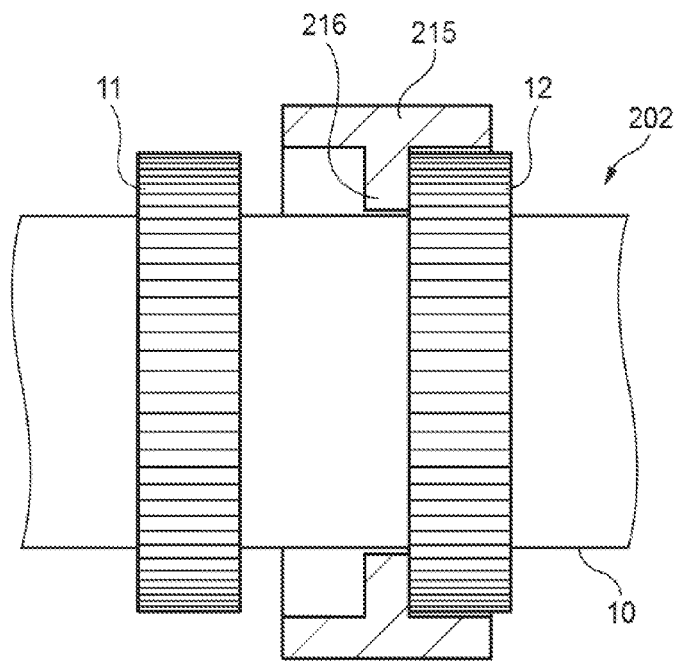

FIGS. 22A and 22B are views for explaining an exemplary embodiment of the present invention which illustrate a configuration of another example of the lens device. The lens device illustrated in FIGS. 22A and 22B is different from the above-described lens device 2 in the configuration of the operation portions provided with the iris ring and the ND filter ring, but other configurations of the lens device are the same as those of the lens device 2. Thus, configurations other than the operation portion are not illustrated, and elements common to those of the above-described lens device 2 are given common numerals, and the description thereof is omitted or summarized.

In a lens device 202 illustrated in FIGS. 22A and 22B, a slide ring (third operation ring) 215 is provided as an operation tool to be engaged with the iris ring (first operation ring) 11 and the ND filter ring (second operation ring) 12 so as to selectively operate the rings 11 and 12. The slide ring 215 is provided to be rotatable around outer periphery of the housing 10, and also to be translationally movable along the rotation axis of the iris ring 11 and the ND filter ring 12 (in the optical axis direction of the lens device 2).

The iris ring 11 and the ND filter ring 12 are arranged close to each other with a predetermined distance therebetween in the optical axis direction of the lens device 2, and the slide ring 215 is disposed at a position between the iris ring 11 and the ND filter ring 12.

The slide ring 215 is translationally movable in the optical axis direction of the lens device 2. While being operated by the photographer to be pushed to the photographic subject side, and to be pulled back to the opposite side, the slide ring 215 is selectively disposed at a first position corresponding to the photographic subject side end in the translational movement range and at a second position corresponding to the opposite side end. The slide ring 215 may have a structure in which a click feeling may be obtained when the slide ring 215 is disposed at the first and second positions.

An annular contact portion 216 projecting toward the inner diameter side is provided on the inner peripheral surface of the slide ring 215. The contact portion 216 is disposed in a state where it is introduced into the gap between the iris ring 11 and the ND filter ring 12 disposed close to each other.

When the slide ring 215 is disposed at the first position (FIG. 22A), the contact portion 216 abuts on the side portion of the iris ring 11 disposed at the photographic subject side between the iris ring 11 and the ND filter ring 12. Accordingly, the iris ring 11 is engaged with the slide ring 215. In this state, when the slide ring 215 is operated to be rotated, the iris ring 11 is also rotated integrally with the slide ring 215 so as to adjust the amount of transmitted light of the diaphragm device.

When the slide ring 215 is disposed at the second position (FIG. 22B), the contact portion 216 abuts on the side portion of the ND filter ring 12. Accordingly, the ND filter ring 12 is engaged with the slide ring 215. In this state, when the slide ring 215 is operated to be rotated, the ND filter ring 12 is also rotated integrally with the slide ring 215 so as to adjust the amount of transmitted light of the light transmittance variable filter.

Another structure in which the side portion of each of the iris ring 11 and the ND filter ring 12 is frictionally engaged with the contact portion 216 of the slide ring 215 may be employed.

According to the lens device 202 configured as described above, a photographer may perform various exposure controls through combination of adjustment of an amount of transmitted light of the diaphragm device and adjustment of an amount of transmitted light of the light transmittance variable filter. Thus, he may photograph images according to various photographing intentions. Also, since the iris ring 11 and the ND filter ring 12 may be selectively operated by one slide ring 215, usability is improved. At the same time, an operation error is suppressed even though the photographer performs an operation while looking into the finder device 6 as long as the photographer recognizes which one of the iris ring 11 and the ND filter ring 12 is disposed at the photographic subject side.

Figure 23A:
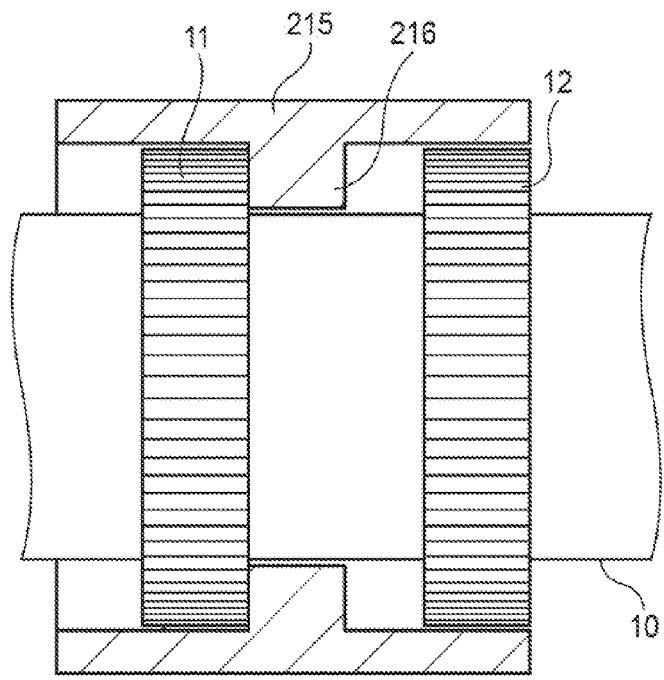
FIGS. 23A and 23B are side views a configuration of a modified example of the operation portion of the lens device in FIGS. 22A and 22B.
Figure 23B:
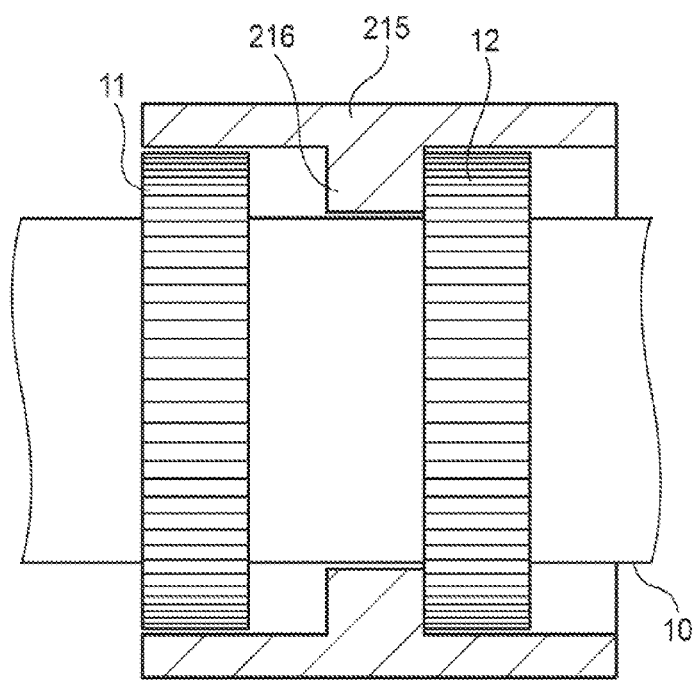

FIGS. 23A and 23B illustrate a modified example of the operation portion of the lens device 202.

In the example illustrated in FIGS. 23A and 23B, a slide ring 215 has a larger diameter than the iris ring 11 and the ND filter ring 12, and is formed to have a width over the iris ring 11 and the ND filter ring 12 so as to cover the rings 11 and 12.

In any one of a case where the slide ring 215 is disposed at the first position (FIG. 23A) and a case where the slide ring 215 is disposed at the second position (FIG. 23B), the iris ring 11 and the ND filter ring 12 are covered with the slide ring 215.

According to the above-described configuration, when one of the iris ring 11 and the ND filter ring 12 is operated by the slide ring 215, the other ring is also covered with the slide ring 215 and is not exposed to the outside. This suppresses a photographer from wrongly touching a ring which is not the object to be operated, thereby suppressing the ring from being rotated.

Figure 24A:
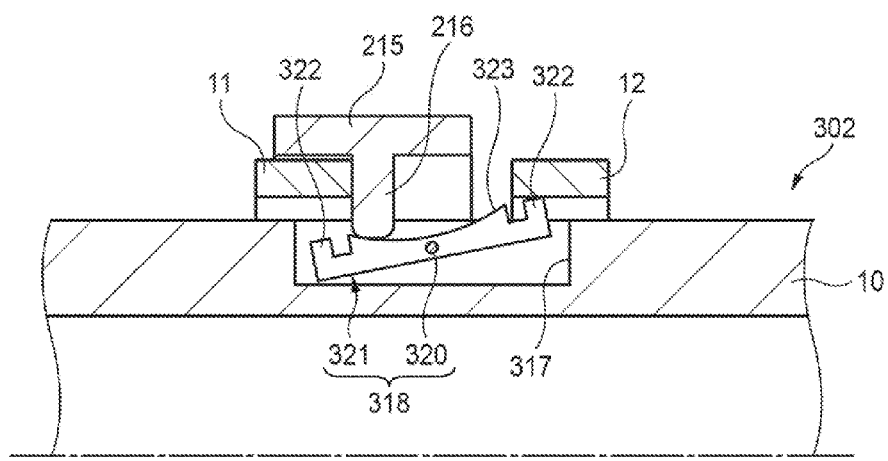
FIGS. 24A and 24B are cross-sectional views for explaining an exemplary embodiment of the present invention which illustrate a configuration of another example of the operation portion provided with the operation tool of the diaphragm device and the operation tool of the light transmittance variable filter in the lens device.
Figure 24B:
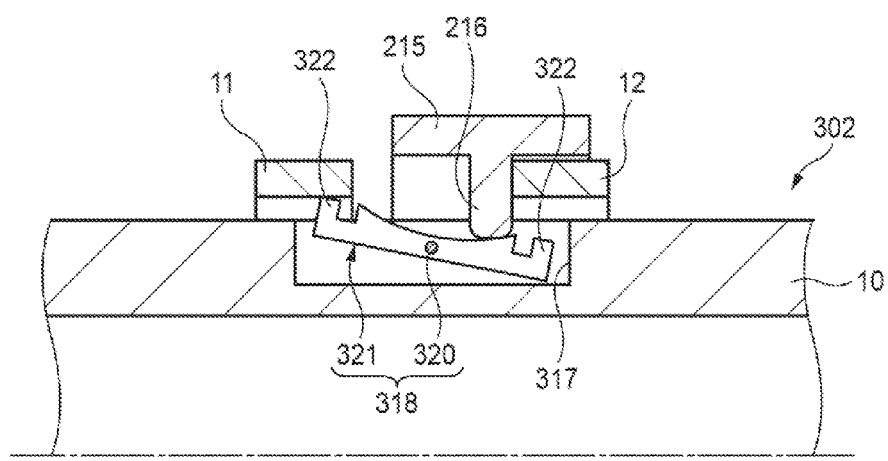
Figure 25:
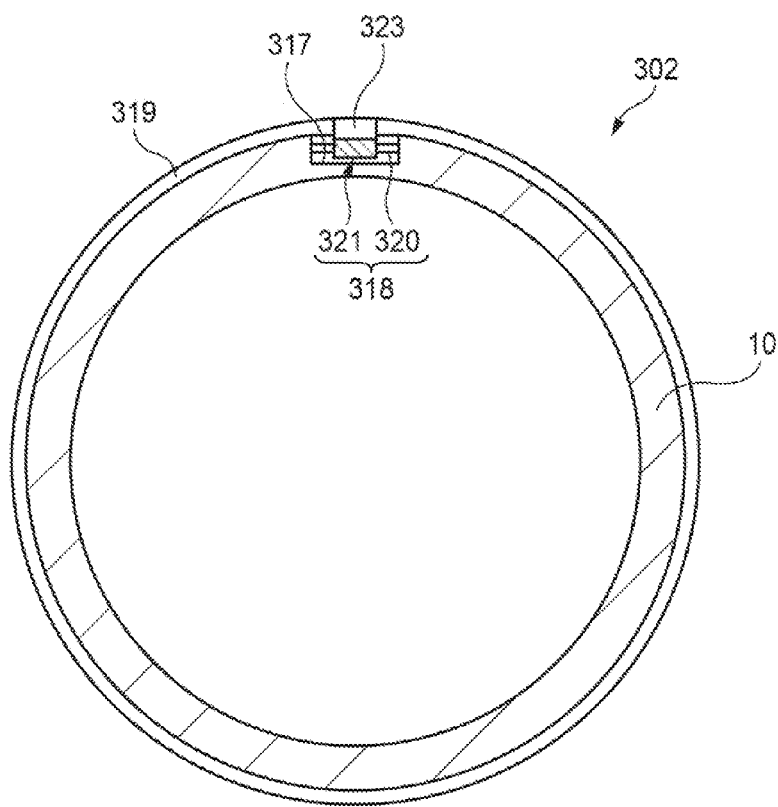
FIG. 25 is a cross-sectional view illustrating the operation portion of the lens device of FIGS. 24A and 24B.

FIGS. 24A, 24B and 25 are views for explaining an exemplary embodiment of the present invention which illustrate a configuration of another example of the lens device. Elements common to those of the above-described lens device 202 are given common numerals, and the description thereof is omitted or summarized.

A lens device 302 illustrated in FIGS. 24A, 24B and 25 is provided with a locking unit configured to restrict the rotation of a ring which is not engaged with a slide ring 215, of the iris ring 11 and the ND filter ring 12, according to the position of the slide ring 215, and, in this regard, the lens device 302 is different from the above-described lens device 202. In FIG. 25, the iris ring 11, the ND filter ring 12, and the slide ring 215 are not illustrated.

In the housing 10 of the lens device 302, a recess 317 is formed at a position between the iris ring 11 and the ND filter ring 12. The locking unit 318 includes a rocker shaft 320 and a rocker 321 supported by the rocker shaft 320 and is received in the recess 317.

The rocker shaft 320 extends in the tangential direction, at the position of the recess 317, of an arc passing through the recess 317 about the rotation axis of the iris ring 11, the ND filter ring 12 and the slide ring 215 and is retained by both side wall portions of the recess 317.

The rocker 321 has a length ranging from the iris ring 11 to the ND filter ring 12 in the optical axis direction of the lens device 302. The rocker 321 is pivotally supported by the rocker shaft 320 at the substantially central portion in the longitudinal direction thereof and extends in the optical axis direction of the lens device 302.

In the above-described configuration, one end of the rocker 321 in the longitudinal direction is disposed to face the inner peripheral surface of the iris ring 11, and the other end is disposed to face the inner peripheral surface of the ND filter ring 12. The longitudinal opposite ends of the rocker 321 are formed with engagement portions 322 which are engaged with the rings that face the engagement portions 322, respectively.

The rocker 321 is formed with a sliding contact portion 323 which has a length that is equal to the translational movement range of the slide ring 215 and is formed in a substantially symmetrical shape with respect to the substantially central portion of the longitudinal direction of the rocker 321 supported by the rocker shaft 320. The surface of the sliding contact portion 323 facing the inner peripheral surface of the slide ring 215 is a curved surface or an inclined surface which is gradually spaced away from the optical axis of the lens device 302 from the substantially central portion of the longitudinal direction of the rocker 321 towards the opposite ends in a state where the rocker 321 is disposed substantially parallel to the optical axis of the lens device 302.

The inner diameter side edge of the contact portion 216 of the slide ring 215 is in contact with the surface of the sliding contact portion 323 of the rocker 321. When the slide ring 215 moves between the first position and the second position, the contact portion 216 slides in the optical axis direction on the surface of the sliding contact portion 323 of the rocker 321. Accordingly, the rocker 321 rocks around the rocker shaft 320. Meanwhile, on the outer peripheral surface of the housing 10 of the lens device 302, an annular groove 319 leading to the recess 317 is formed, and the inner diameter side edge of the contact portion 216 is received in the groove 319.

When the slide ring 215 is disposed at the first position (FIG. 24A), the contact portion 216 abuts on the side portion of the iris ring 11. Accordingly, the iris ring 11 is engaged with the slide ring 215. In this state, when the slide ring 215 is operated to be rotated, the iris ring 11 is also rotated integrally with the slide ring 215 so as to adjust the amount of transmitted light of the diaphragm device.

Here, the contact portion 216 pushes the photographic subject-side end of the sliding contact portion 323 toward the optical axis of the lens device 302 while sliding in the circumferential direction on the surface of the photographic subject-side end of the sliding contact portion 323 of the rocker 321, and the engagement portion 322 formed at the opposite side end to the photographic subject side of the rocker 321 is engaged with the inner peripheral surface of the ND filter ring 12. Accordingly, rotation of the ND filter ring 12 is restricted.

When the slide ring 215 is disposed at the second position (FIG. 24B), the contact portion 216 abuts on the side portion of the ND filter ring 12. Accordingly, the ND filter ring 12 is engaged with the slide ring 215. In this state, when the slide ring 215 is operated to be rotated, the ND filter ring 12 is also rotated integrally with the slide ring 215 so as to adjust the amount of transmitted light of the light transmittance variable filter.

Here, the contact portion 216 pushes the opposite side end to the photographic subject side on the surface of the sliding contact portion 323 of the rocker 321 toward the optical axis of the lens device 302, and the engagement portion 322 formed at the photographic subject side end of the rocker 321 is engaged with the inner peripheral surface of the iris ring 11. Accordingly, rotation of the iris ring 11 is restricted.

The inner peripheral surface of each of the iris ring 11 and the ND filter ring 12 and the engagement portion 322 of the rocker 321 may be configured to be frictionally engaged with each other.

According to the lens device 302 configured as described above, when one of the iris ring 11 and the ND filter ring 12 is operated by the slide ring 215, rotation of the other ring is restricted by the locking unit 318. This suppresses a photographer from wrongly touching a ring which is not the object to be operated, thereby preventing the ring from being rotated.

In the illustrated example, only one locking unit 318 is illustrated. However, a plurality of locking units may be provided to be appropriately distributed around the outer periphery of the housing 10 of the lens device 302.

Figure 26A:
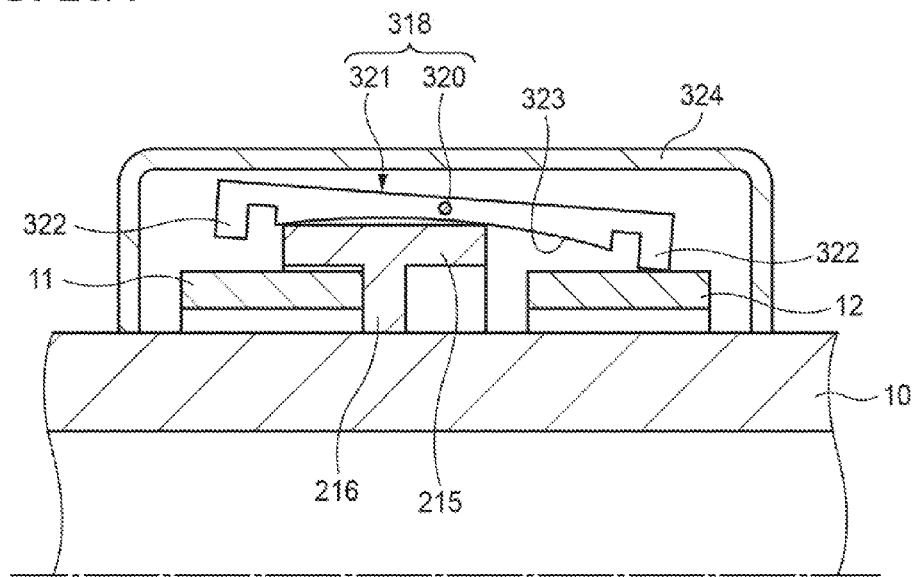
FIGS. 26A and 26B are cross-sectional views illustrating a configuration of a modified example of the operation portion of the lens device of FIGS. 24A and 24B.
Figure 26B:
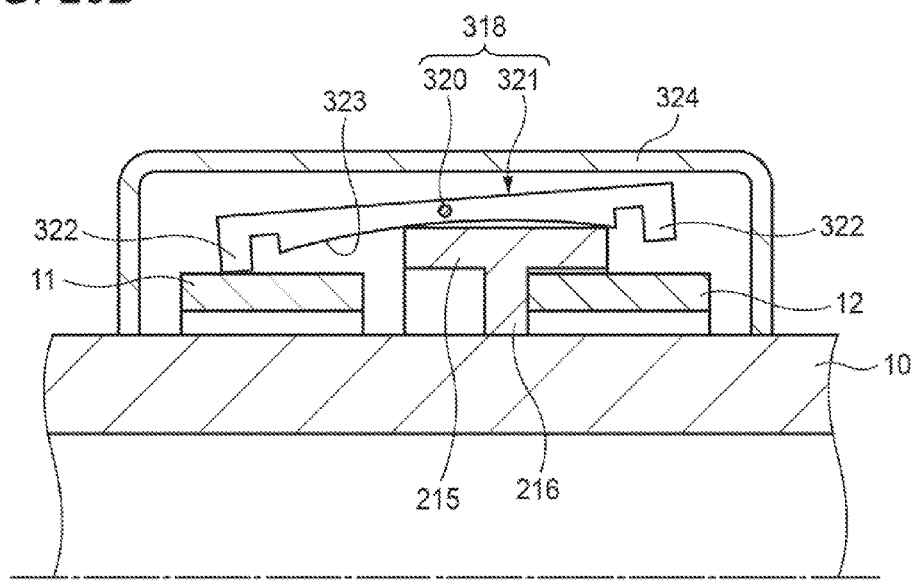

FIGS. 26A and 26B illustrate a configuration of a modified example of the above-described lens device 302.

In the lens device 302 illustrated in FIGS. 24A, 24B, and 25, the locking unit 318 is disposed at the inner diameter side of the slide ring 215. However, the example illustrated in FIGS. 26A and 26B is different from the example illustrated in FIGS. 24A, 24B and 25 in that the locking unit 318 is disposed at the outer diameter side of the slide ring 215.

A rocker shaft 320 and a rocker 321 constituting the locking unit 318 are accommodated in an appropriate case 324, and the rocker shaft 320 is supported by the case 324. The case 324 is mounted to an appropriate portion on the outer periphery of the operation portion provided with the iris ring 11, the ND filter ring 12 and the slide ring 215, on the housing 10 of the lens device 302. The case 324 is formed with a notch (not illustrated) that allows the iris ring 11, the ND filter ring 12 and the slide ring 215 to be introduced into or taken out from the case.

The rocker 321 is disposed such that the surface of the sliding contact portion 323 faces the outer peripheral surface of the slide ring 215, and is supported by the rocker shaft 320. The outer diameter side edge of the slide ring 215 is in contact with the surface of the sliding contact portion 323 of the rocker 321. When the slide ring 215 moves between the first position and the second position, the outer diameter side edge of the slide ring 215 slides on the surface of the sliding contact portion 323 of the rocker 321. Accordingly, the rocker 321 rocks around the rocker shaft 320.

When the slide ring 215 is disposed at the first position (FIG. 26A), the contact portion 216 abuts on the side portion of the iris ring 11. Accordingly, the iris ring 11 is engaged with the slide ring 215. In this state, when the slide ring 215 is operated to be rotated, the iris ring 11 is also rotated integrally with the slide ring 215 so as to adjust the amount of transmitted light of the diaphragm device.

Here, the outer diameter side edge of the slide ring 215 pushes up the photographic subject-side end of the surface of the sliding contact portion 323 of the rocker 321 in a direction away from the optical axis, and the engagement portion 322 formed at the opposite side end to the photographic subject side of the rocker 321 is engaged with the outer peripheral surface of the ND filter ring 12. Accordingly, the rotation of the ND filter ring 12 is restricted.

When the slide ring 215 is disposed at the second position (FIG. 26B), the contact portion 216 abuts on the side portion of the ND filter ring 12. Accordingly, the ND filter ring 12 is engaged with the slide ring 215. In this state, when the slide ring 215 is operated to be rotated, the ND filter ring 12 is also rotated integrally with the slide ring 215 so as to adjust the amount of transmitted light of the light transmittance variable filter.

Here, the outer diameter side edge of the slide ring 215 pushes up the opposite side end to the photographic subject side of the surface of the sliding contact portion 323 of the rocker 321 in a direction away from the optical axis, and the engagement portion 322 formed at the photographic subject side end of the rocker 321 is engaged with the outer peripheral surface of the iris ring 11. Accordingly, the rotation of the iris ring 11 is restricted.

Figure 27A:
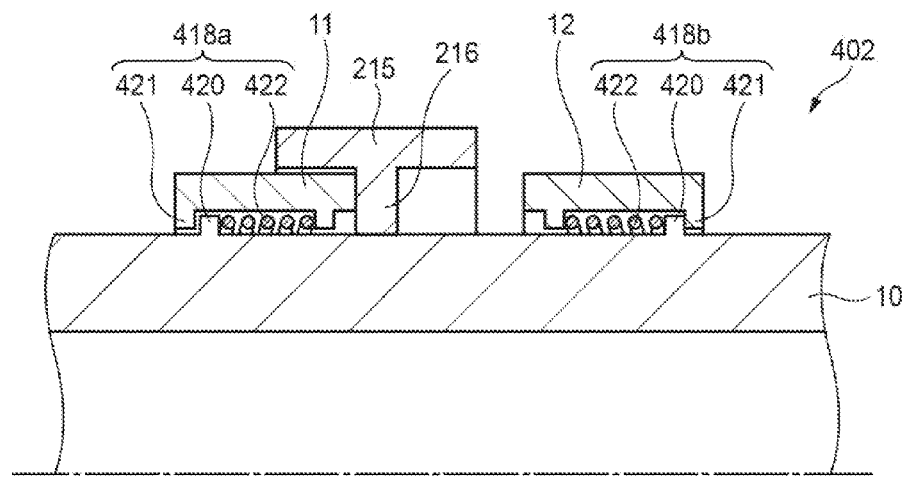
FIGS. 27A and 27B are cross-sectional views for explaining an exemplary embodiment of the present invention which illustrate a configuration of another example of the operation portion provided with the operation tool of the diaphragm device and the operation tool of the light transmittance variable filter in the lens device.
Figure 27B:
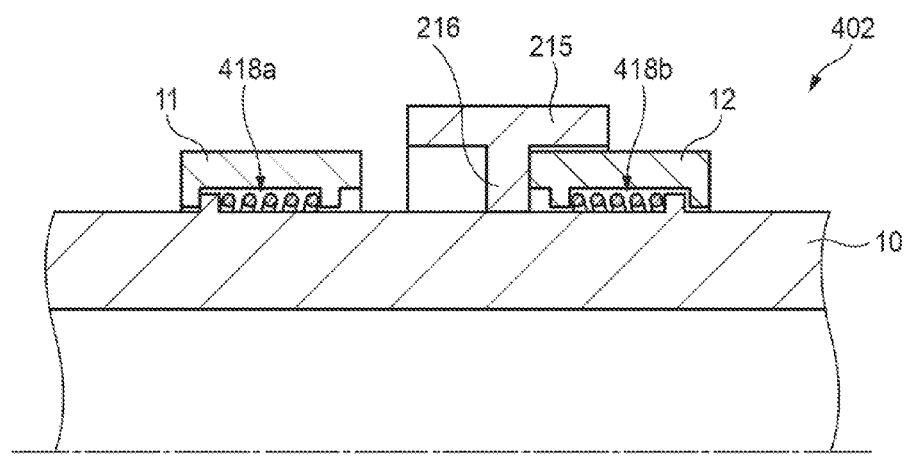

FIGS. 27A and 27B are views for explaining an exemplary embodiment of the present invention which schematically illustrate a configuration of another example of the lens device. Elements common to those of the above-described lens device 202 are given common numerals, and the description thereof is omitted or summarized.

A lens device 402 illustrated in FIGS. 27A and 27B is different from the above-described lens device 302 in the configuration of the locking unit in that a first locking unit 418a for the iris ring 11 and a second locking unit 418b for the ND filter ring 12 are formed separately.

The first locking unit 418a includes an engagement portion 420 formed on the housing 10 of the lens device 402, a contact portion 421 formed on the iris ring 11 to be abutted on the engagement portion 420, and a biasing member 422 configured to bias the iris ring 11 in the direction in which the contact portion 421 is abutted on the engagement portion 420.

The engagement portion 420 is provided at an area to be covered with the iris ring 11 on the housing 10, and protrudes toward the outer diameter side to be formed in an annular shape. The contact portion 421 at one side is provided on the inner peripheral surface of the iris ring 11, and protrudes toward the inner diameter side to be formed in an annular shape. The contact portion 421 is disposed to abut on the engagement portion 420 from the photographic subject side, that is, in the opposite direction to the movement direction of the slide ring 215 from the second position to the first position.

As for the biasing member 422, in the illustrated example, a coil spring formed in a cylindrical shape is used. The coil spring is wound around the outer periphery of the area covered with the iris ring 11 on the housing 10. One end of the biasing member 422 in the axial direction is fixed to the engagement portion 420, and the other end is engaged with the iris ring 11. The iris ring 11 is biased by the biasing member 422 in the opposite direction to the movement direction of the slide ring 215 from the second position to the first position. Accordingly, the contact portion 421 of the iris ring 11 is abutted on the engagement portion 420 from the photographic subject side.

The second locking unit 418b is configured in the same manner as the first locking unit 418a, and includes an engagement portion 420 formed on the housing 10 of the lens device 402, a contact portion 421 formed on the ND filter ring 12 to be abutted on the engagement portion 420, and a biasing member 422 configured to bias the ND filter ring 12 in the direction in which the contact portion 421 is abutted on the engagement portion 420. The direction in which the ND filter ring 12 is biased by the biasing member 422 and the contact portion 421 is abutted on the engagement portion 420 is set to be opposite to the movement direction of the slide ring 215 from the first position to the second position.

When the slide ring 215 is disposed at the first position (FIG. 27A), the contact portion 216 abuts on the side portion of the iris ring 11. Accordingly, the iris ring 11 is engaged with the slide ring 215. Here, the iris ring 11 is forcedly pressed in the movement direction of the slide ring 215 from the second position to the first position, that is, in the opposite direction to the direction in which the iris ring 11 is biased by the biasing member 422 of the first locking unit 418a. Accordingly, the engagement between the contact portion 421 and the engagement portion 420 constituting the first locking unit 418a is released. In this state, when the slide ring 215 is operated to be rotated, the iris ring 11 is also rotated integrally with the slide ring 215 so as to adjust the amount of transmitted light of the diaphragm device.

Meanwhile, the rotation of the ND filter ring 12 is restricted since the contact portion 421 and the engagement portion 420 constituting the second locking unit 418b are engaged with each other.

When the slide ring 215 is disposed at the second position (FIG. 27B), the contact portion 216 abuts on the side portion of the ND filter ring 12. Accordingly, the ND filter ring 12 is engaged with the slide ring 215. Here, the ND filter ring 12 is forcedly pressed in the movement direction of the slide ring 215 from the first position to the second position, that is, the opposite direction to the direction in which the ND filter ring 12 is biased by the biasing member 422 of the second locking unit 418b. Accordingly, the engagement between the contact portion 421 and the engagement portion 420 constituting the second locking unit 418b is released. In this state, when the slide ring 215 is operated to be rotated, the ND filter ring 12 is also rotated integrally with the slide ring 215 so as to adjust the amount of transmitted light of the light transmittance variable filter.

Meanwhile, the rotation of the iris ring 11 is restricted since the contact portion 421 and the engagement portion 420 constituting the first locking unit 418a are engaged with each other.

Figure 28A:
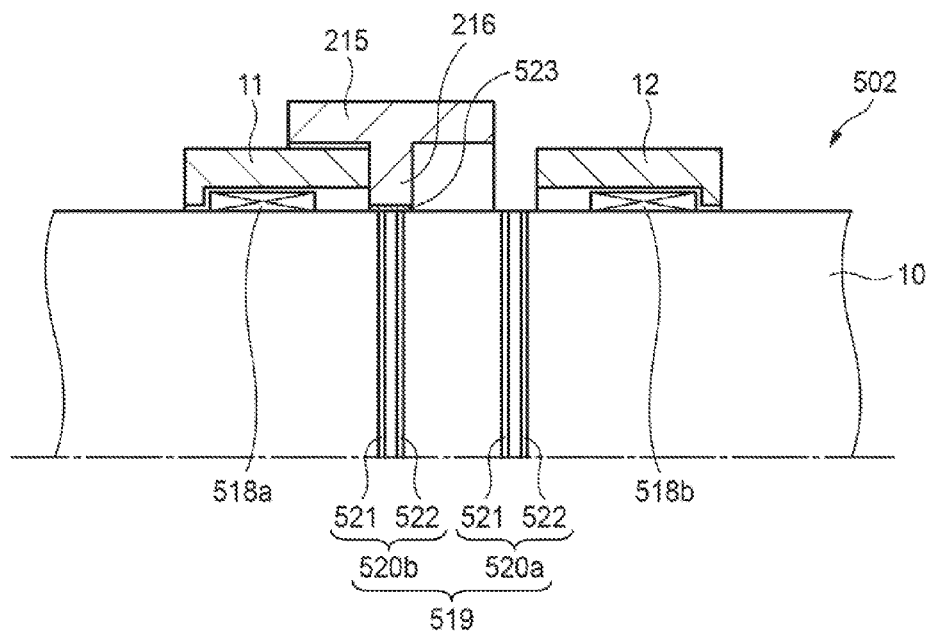
FIGS. 28A and 28B are side views for explaining an exemplary embodiment of the present invention which illustrate a configuration of another example of the operation portion provided with the operation tool of the diaphragm device and the operation tool of the light transmittance variable filter in the lens device.
Figure 28B:
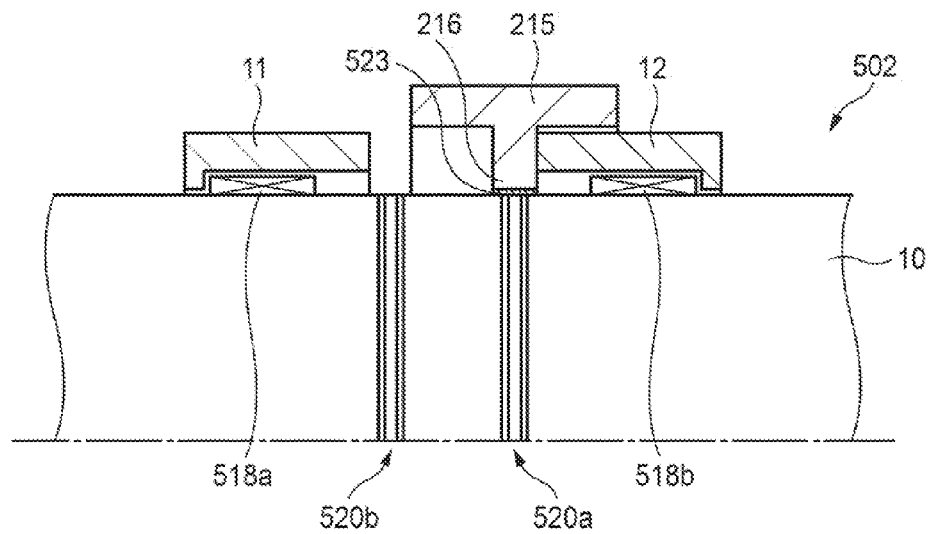

FIGS. 28A and 28B are views for explaining an exemplary embodiment of the present invention which schematically illustrate a configuration of another example of the lens device. Elements common to those of the above-described lens device 202 are given common numerals, and the description thereof is omitted or summarized.

While all the above described locking units of the above-described lens devices 202, 302 and 402 are configured to restrict the rotation of the iris ring 11 and the ND filter ring 12 by mechanical engagement, the locking unit of a lens device 502 illustrated in FIGS. 28A and 28B electromagnetically restricts the rotation of the iris ring 11 and the ND filter ring 12.

The locking unit includes a first electromagnet 518a for the iris ring 11, a second electromagnet 518b for the ND filter ring 12, and a switch unit 519 configured to selectively energize a coil of the first electromagnet 518a and a coil of the second electromagnet 518b.

The switch unit 519 includes two sets of switch circuits 520a and 520b provided in the housing 10 of the lens device 502. One switch circuit 520a corresponds to the first electromagnet 518a, and the other switch circuit 520b corresponds to the second electromagnet 518b. In the movable range of the contact portion 216 in the movement of the slide ring 215 from the first position where the contact portion 216 is abutted on the iris ring 11 to the second position where the contact portion 216 is abutted on the ND filter ring 12, the switch circuit 520a is disposed at the ND filter ring 12 side end, and the switch circuit 520b is disposed at the iris ring 11 side end.

The switch circuit 520a is constituted by two conductor patterns 521 and 522 which are annularly formed on the outer peripheral surface of the housing 10 to be close to each other in the optical axis direction of the lens device 502. One conductor pattern 521 is connected to a power source (not illustrated), and the other conductor pattern 522 is connected to one end of the coil of the first electromagnet 518a. The other end of the coil of the first electromagnet 518a is connected to the above-described power source.

Like the switch circuit 520a, the switch circuit 520b is constituted by two conductor patterns 521 and 522 which are annularly formed on the outer peripheral surface of the housing 10 to be close to each other in the optical axis direction of the lens device 502. One conductor pattern 521 is connected to a power source (not illustrated), and the other conductor pattern 522 is connected to one end of the coil of the second electromagnet 518b. The other end of the coil of the second electromagnet 518b is connected to the above-described power source.

An electrical contact portion 523 configured to slide on the outer peripheral surface of the housing 10 is formed at the inner diameter side edge of the contact portion 216 of the slide ring 215.

When the slide ring 215 is disposed at the first position (FIG. 28A), the contact portion 216 abuts on the side portion of the iris ring 11. Accordingly, the iris ring 11 is engaged with the slide ring 215. In this state, when the slide ring 215 is operated to be rotated, the iris ring 11 is also rotated integrally with the slide ring 215 so as to adjust the amount of transmitted light of the diaphragm device.

Here, the electrical contact portion 523 of the contact portion 216 is bridged over the conductor patterns 521 and 522 of the switch circuit 520b corresponding to the second electromagnet 518b to electrically connect the conductor patterns 521 and 522 to each other. Accordingly, the switch circuit 520b is closed to energize the coil of the second electromagnet 518b. Thus, the second electromagnet 518b generates a magnetic force by which the ND filter ring 12 is attracted to the second electromagnet 518b so that the rotation of the ND filter ring 12 is restricted. In the lens device 502, it is assumed that the ND filter ring 12 is made of a magnetic material, or its surface facing the second electromagnet 518b is affixed with a to-be-attracted member made of a magnetic material.

When the slide ring 215 is disposed at the second position (FIG. 28B), the contact portion 216 abuts on the side portion of the ND filter ring 12. Accordingly, the ND filter ring 12 is engaged with the slide ring 215. In this state, when the slide ring 215 is operated to be rotated, the ND filter ring 12 is also rotated integrally with the slide ring 215 so as to adjust the amount of transmitted light of the light transmittance variable filter.

Here, the electrical contact portion 523 of the contact portion 216 is bridged over the conductor patterns 521 and 522 of the switch circuit 520a corresponding to the first electromagnet 518a to electrically connect the conductor patterns 521 and 522 to each other. Accordingly, the switch circuit 520a is closed to energize the coil of the first electromagnet 518a. Thus, the first electromagnet 518a generates a magnetic force by which the iris ring 11 is attracted to the first electromagnet 518a so that the rotation of the iris ring 11 is restricted. In the lens device 502, it is assumed that, like in the ND filter ring 12, the iris ring 11 is made of a magnetic material, or its surface facing the first electromagnet 518a is affixed with a to-be-attracted member made of a magnetic material.

The configuration of the operation portion using the above-described slide ring 215 may be employed in the operation portion of the lens device in the image capturing apparatus illustrated in each of FIGS. 5, 8, 10, and 11. However, in a case where the iris ring 11 is manually operated like in the image capturing apparatus illustrated in FIG. 11, and the ND filter ring 12 is rotationally driven by a motor drive mechanism to automatically control the light transmittance variable filter, or in a case where the iris ring 11 and the ND filter ring 12 are rotationally driven by using a motor drive mechanism to automatically control the diaphragm device and the light transmittance variable filter, the iris ring 11 and the ND filter ring 12 are rotated at once. Thus, when the locking unit is provided, its application to the operation portion of the lens device in the image capturing apparatus illustrated in FIG. 11 is limited. Hereinafter, description will be made on a configuration of an operation portion employing a slide ring 215 which is appropriate for a case where the diaphragm device or the light transmittance variable filter are automatically controlled by using a motor drive mechanism.

Figure 29A:
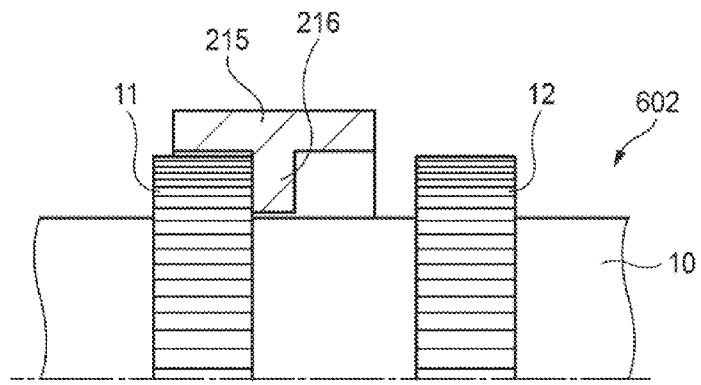
FIGS. 29A, 29B, and 29C are side views for explaining an exemplary embodiment of the present invention which illustrate a configuration of another example of the operation portion provided with the operation tool of the diaphragm device and the operation tool of the light transmittance variable filter in the lens device.
Figure 29B:
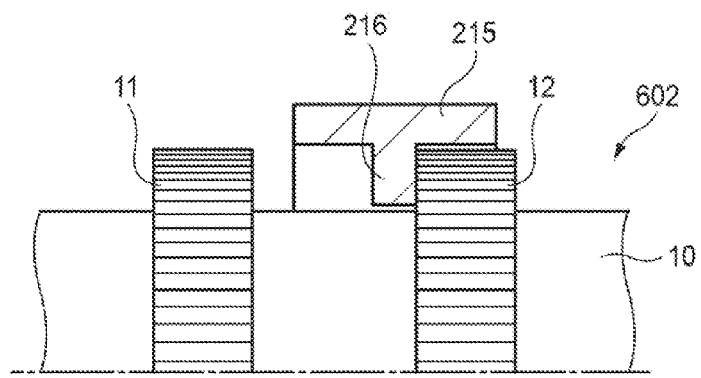
Figure 29C:
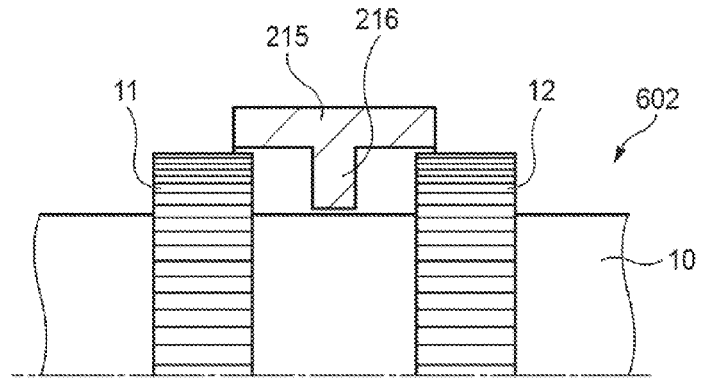

FIGS. 29A, 29B, and 29C are views for explaining an exemplary embodiment of the present invention which schematically illustrate a configuration of another example of the lens device. Elements common to those of the above-described lens device 202 are given common numerals, and the description thereof is omitted or summarized.

In a lens device 602 illustrated in FIGS. 29A, 29B, and 29C, the slide ring 215 is translationally movable in the optical axis direction, and as for its disposition position within the translational movement range, a third position corresponding to a substantially central portion in the translational movement range as well as a first position corresponding to the photographic subject side end, and a second position corresponding to the opposite side end are provided.

The slide ring 215, at the first position, is engaged with the iris ring 11 which is disposed at the photographic subject side, between the iris ring 11 and the ND filter ring 12 (FIG. 29A), and at the second position, is engaged with the ND filter ring 12 (FIG. 29B). The slide ring 215, at the third position, is not engaged with both the iris ring 11 and the ND filter ring 12 (FIG. 29C).

In the above-described configuration, when the slide ring 215 is disposed at the third position, both the iris ring 11 and the ND filter ring 12 may be operated to be rotated at once. Therefore, the iris ring 11 and the ND filter ring 12 may be configured to be rotationally driven by the motor drive mechanism. When the motor drive mechanism is employed, the iris ring 11 and the ND filter ring 12 are rotationally driven by monitoring the amount of light received by the image capturing element within the image capturing apparatus body 1 based on the signal from the image capturing apparatus body 1 such that the exposure may be appropriately automatically controlled.

FIG. 30 is a functional block diagram of a main part of the entire image capturing apparatus in which the above-described lens device 602 is mounted in the image capturing apparatus body 1. Elements common to those of the image capturing apparatus illustrated in FIG. 11 are given common numerals, and the description thereof is omitted or summarized.

The image capturing apparatus illustrated in FIG. 30 is configured such that the iris ring 11 and the ND filter ring 12 are rotationally driven by a motor drive mechanism to automatically and appropriately control an exposure.

In the lens device 602, the photographing lenses 31 and 32, the diaphragm device 15, the light transmittance variable filter 16, and an exposure control unit 44 are incorporated. The exposure control unit 44 is configured to perform an exposure control by changing the amounts of transmitted light of the diaphragm device 15, and the light transmittance variable filter 16 according to the brightness of the photographic subject.

The dashed-line circle X illustrated in FIG. 30 indicates the outer peripheral portion of the housing 10 of the lens device 602. A drive unit is detachably attached to the outer peripheral portion of the housing 10 to rotationally drive the iris ring 11 and the ND filter ring 12 in a state where the slide ring 215 is disposed at the third position.

The drive unit includes a motor 36a (driving unit) configured to rotationally drive the iris ring 11, a motor 36b (driving unit) configured to rotationally drive the ND filter ring 12, and a potentiometer 17a configured to detect a rotation angle of the iris ring 11. A potentiometer 17b configured to detect a rotation angle of the ND filter ring 12 is incorporated in the housing 10. In the present example, the drive unit is detachably attached to the outer peripheral portion of the housing 10. However, the drive unit may be incorporated in the housing 10. In such a case, the rotation of the iris ring 11 and the ND filter ring 12 is switchable between an operation by the motors 36a and 36b, and a manual operation.

The exposure control unit 44 acquires an imaging signal output from the image capturing element module 20 of the image capturing apparatus body 1, and detects a change in brightness of the photographic subject based on the imaging signal. When there is a change in brightness of the photographic subject, the exposure control unit 44 transmits a driving signal to at least one of the motor 36a configured to rotationally drive the iris ring 11 and the motor 36b configured to rotationally drive the light transmittance variable filter 16 and the ND filter ring 12 such that the photographic subject of the brightness is subjected to a predetermined exposure (proper exposure that has been predetermined for brightness). This changes at least one of an amount of transmitted light of the diaphragm device 15 and an amount of transmitted light of the light transmittance variable filter 16.

The rotation angle of the iris ring 11 detected by the potentiometer 17a is fed back to the exposure control unit 44. The exposure control unit 44 controls the motor 36a such that the rotation angle of the iris ring 11 becomes a value according to the predetermined exposure.

The exposure control unit 44 applies a voltage to the electrodes of the light transmittance variable filter 16 to control the transmittance of the light transmittance variable filter 16. In the vicinity of the light transmittance variable filter 16, the transmittance monitor 19 is disposed so that the transmittance of the light transmittance variable filter 16 detected by the transmittance monitor 19 is fed back to the exposure control unit 44. The exposure control unit 44 controls a voltage value to be applied to the electrodes of the light transmittance variable filter 16 such that transmittance of the light transmittance variable filter 16 becomes a value according to the predetermined exposure.

The rotation angle of the ND filter ring 12 detected by the potentiometer 17b is fed back to the exposure control unit 44. The exposure control unit 44 controls the motor 36b such that the rotation angle of the ND filter ring 12 becomes an angle corresponding to the transmittance of the light transmittance variable filter 16.

The exposure control unit 44 performs an exposure control according to, for example, a program diagram to be described below.

Figure 31:
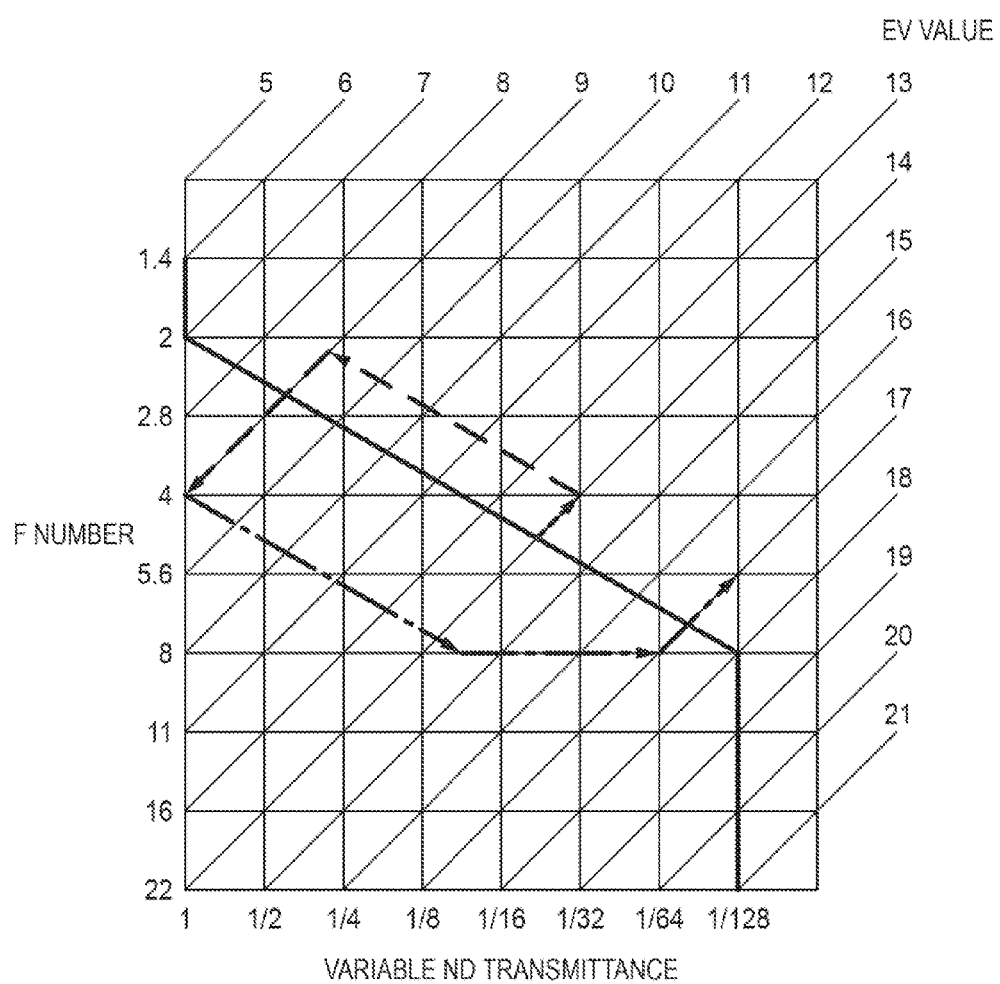
FIG. 31 illustrates a program diagram for explaining an example of an exposure control method in the image capturing apparatus of FIG. 30.

FIG. 31 is a view illustrating an example of a program diagram for an exposure control. In FIG. 31, the vertical axis represents an F number of the diaphragm device 15 and the horizontal axis represents transmittance (variable ND transmittance) of the light transmittance variable filter 16. In the variable ND transmittance, the state allowing light to be transmitted to the maximum is indicated as transmittance=1. In FIG. 31, each line diagonally drawn on the coordinate represents an exposure value (EV value). The EV value corresponds to brightness of the photographic subject, and the larger the EV value, the brighter the photographic subject. At all the points on the same line, the exposure is constant and when the variable ND transmittance is 1 and F is 1.0, it is defined as EV1. Each time when the EV value is increased by one, the exposure is halved.

The exposure control unit 44 performs an exposure control along the thick solid line illustrated in FIG. 31. The exposure control unit 44 controls the exposure by changing only the F number of the diaphragm device 15 while maintaining the variable ND transmittance to the maximum until EV7. When the EV value exceeds EV7, the exposure control unit 44 controls the exposure by changing both the F number and the variable ND transmittance along the thick solid line in FIG. 31. When the EV value exceeds EV18, the exposure control unit 44 controls the exposure by changing only the F number of the diaphragm device 15 while maintaining the variable ND transmittance to the minimum.

The exposure control by the exposure control unit 44 may be performed through a first method and a second method. In the first method, a target EV value is not determined in advance, and the EV value is changed until an optimum exposure is obtained. In the second method, an EV value for an optimum exposure is determined in advance based on an imaging signal, and the F number and the variable ND transmittance are changed to reach the EV value within the shortest time. The program diagram in FIG. 31 illustrates a program diagram used for the first method.

It is assumed that the lens device 602 may obtain a good resolving power when the F number is in the range of 2 to 8 and the lens device 602 may obtain the maximum resolving power when the F number is 4. In this case, performing the photographing in a state where the F number is 4 if possible is desirable for improving the image quality. However, for example, when the F number is fixed to 4 and only the variable ND transmittance is changed to perform the exposure control, the length of time until the EV value reaches the target value may be increased.

For example, in a case where an optimum exposure may be obtained at EV14 by increasing the EV value from EV6, it is possible to obtain a maximum resolving power and to obtain correct exposure by employing a method of changing the F number from 1.4 to 4 while fixing the variable ND transmittance, and then changing the variable ND transmittance from 1 to $\frac{1}{32}$ while fixing the F number. In contrast, when the EV value is changed from EV6 to EV14 along the thick solid line of FIG. 31, it is required to change the F number to a value between 4 and 5.6 and to change the variable ND transmittance to a value between $\frac{1}{16}$ and $\frac{1}{32}$. Thus, the change width of the variable ND transmittance may be reduced as compared to the case of fixing the F number to 4 so that the length of time until the optimum exposure is obtained may be shortened.

In this case, the F number falls off 4, which will have a limited influence on the image quality since it is possible to obtain a good resolving power when the F number is in the range of 2 to 8 as described above. Therefore, the exposure control unit 44 changes both the F number and the variable ND transmittance within the range of EV value from EV7 that is determined by combination of the minimum F number (F2) when the F number is in the range of 2 to 8 and the maximum variable ND transmittance (=1) to EV18 that is determined by combination of the maximum F number F8 when the F number is in range of 2 to 8 and the minimum variable ND transmittance (=$\frac{1}{128}$), thereby reducing the length of time until the optimum exposure is obtained while maintaining a good resolving power.

When the F number at the time when the optimum exposure is obtained (referred to as Fa) does not become an F number at which the maximum resolving power is obtained (here, F4) and the variable ND transmittance is not minimum or maximum, after obtaining the optimum exposure by changing both the F number and the variable ND transmittance, the exposure control unit 44 changes the variable ND transmittance such that the F number is close to F4 and the optimum exposure is maintained.

For example, in FIG. 31, description will be made on a case where the brightness of the photographic subject is changed in the brighter direction while the F number and the variable ND transmittance are placed at the point of intersection between on the diagonal line of EV8 and the thick solid line. When the optimum exposure has been obtained at the time when EV is increased from EV8 to E14, Fa≠F4, and the variable ND transmittance is neither maximum nor minimum. Thus, the exposure control unit 44 sets the F number to 4, and the variable ND transmittance to $\frac{1}{32}$ while maintaining EV14, as indicated by the dashed line arrow in FIG. 31.

Here, the exposure control unit 44 supplies a driving signal to the motors 36a and 36b so that the diaphragm device 15 is opened at a rate that matches a rate at which the variable ND transmittance is changed to $\frac{1}{32}$. Accordingly, the EV value is 14 as it is and the F number becomes 4. Thus, it is possible to maximize the resolving power while maintaining the optimum exposure.

When the brightness of the photographic subject becomes dark at the state where the F number is 4 and the variable ND transmittance is $\frac{1}{32}$, the exposure control unit 44 gradually decreases the EV value by changing both the F number and the variable ND transmittance along the dashed line arrow diagonally directed to the upper left in FIG. 31. When the optimum exposure has been obtained at the time when the EV value becomes EV9, the exposure control unit 44 changes the F number to 4 and the variable ND transmittance to 1 while maintaining EV9, as indicated by the dashed line arrow diagonally directed to the lower left in FIG. 31.

When the brightness of the photographic subject becomes bright at the state where the F number is 4 and the variable ND transmittance is 1, the exposure control unit 44 gradually increases the EV value by changing both the F number and the variable ND transmittance along the one-dot chain line arrow diagonally directed to the lower right in FIG. 31. When the F number becomes 8, the exposure control unit 44 does not further change the F number but decreases only the variable ND transmittance (one-dot chain line arrow directed to the right in FIG. 31). When the optimum exposure has been obtained at the time when the EV value becomes EV17, the exposure control unit 44 changes the F number to F5.6 which is close to F4 and the variable ND transmittance to $\frac{1}{128}$ while maintaining EV17, as indicated by the one-dot chain line arrow diagonally directed to the upper right in FIG. 31.

As described above, when the F number is not a value at which the maximum resolving power is achieved and the variable ND transmittance is neither minimum nor maximum, after obtaining a correct exposure, the exposure control unit 44 performs a control so as to make the F number close to a value at which the maximum resolving power is obtained. This control may always allow the resolving power to be close to a higher value in the range from EV7 to EV18, which enables photographing with high quality. Further, after the optimum exposure is obtained, the F number and the variable ND transmittance are changed while the optimum exposure is maintained. Thus, since only the resolving power is improved without changing the exposure, high image quality may be realized without a sense of discomfort.

When the exposure control unit 44 performs the exposure control by the second method (in which the target EV value is determined and the F number and the variable ND transmittance are changed to reach the target EV value within the shortest time), a highly responsive exposure control is enabled because it is possible to reach the optimum exposure within the shortest time. Then, because a control for increasing resolving power is made while the optimum exposure is maintained after the optimum exposure is obtained, it is possible to achieve both the improvement of responsiveness and the improvement of resolving power.

The above-described program diagram is an example, and other various program diagrams may be applied to the exposure control in the exposure control unit 4.

As described above, the present specification discloses the following items.

(1) It is a lens device for an image capturing apparatus incorporating a photographing lens and a diaphragm device configured to narrow an aperture area, the lens device comprising: a cylindrical housing that incorporates the photographing lens and the diaphragm device; a first operation ring that is mounted on an outer peripheral portion of the housing to be rotatable in a circumferential direction of the outer peripheral portion so as to adjust the aperture area of the diaphragm device; and a second operation ring that is mounted on the outer peripheral portion of the housing in parallel to the first operation ring to be rotatable coaxially with the first operation ring so as to adjust a transmittance of a light transmittance variable filter, wherein a correspondence relationship between an operation amount of the first operation ring and a change rate of an amount of transmitted light of the diaphragm device, and a correspondence relationship between an operation amount of the second operation ring and a change rate of an amount of transmitted light of the light transmittance variable filter are set to be the same.

(2) It is the lens device of (1), wherein the first operation ring and the second operation ring are arranged close to each other.

(3) It is the lens device of (2), further comprising a non-movable partition plate that is provided between the first operation ring and the second operation ring.

(4) It is the lens device of (2) or (3), wherein a difference is made between a surface structure of an outer peripheral surface of the first operation ring and a surface structure of an outer peripheral surface of the second operation ring.

(5) It is the lens device of (4), wherein the difference in surface structure is at least one or a combination of two or more of a difference of densities of knurled grooves formed on respective outer surfaces of the first operation ring and the second operation ring, a difference of shapes of irregularities formed on the respective outer surfaces of the first operation ring and the second operation ring, a difference of inclination angles of the respective outer surfaces of the first operation ring and the second operation ring with respect to an incident optical axis, a difference of widths of the respective outer surfaces of the first operation ring and the second operation ring, a difference of the numbers of notches placed in a circumference direction of the respective outer surfaces of the first operation ring and the second operation ring, a difference of surface roughnesses of the respective outer surfaces of the first operation ring and the second operation ring, a difference of hardnesses of materials formed on the respective outer surfaces of the first operation ring and the second operation ring, and a difference of heights of the respective outer surfaces of the first operation ring and the second operation ring.

(6) It is the lens device of (5), further comprising a motor drive mechanism which uses the knurled outer surfaces of the first operation ring and the second operation ring as gears.

(7) It is the lens device of (2), further comprising a third operation ring that is provided to be movable along a rotation axis of the first operation ring and the second operation ring to a plurality of positions including a first position at which the third operation ring is engaged with the first operation ring and a second position at which the third operation ring is engaged with the second operation ring, as well as to be rotatable in the circumferential direction of the outer peripheral portion.

(8) It is the lens device of (7), further comprising a locking unit configured to restrict the rotation of the second operation ring when the third operation ring is disposed at the first position, and to restrict the rotation of the first operation ring, when the third operation ring is disposed at the second position.

(9) It is the lens device of (8), wherein the locking unit includes a rocker shaft provided at a position between the first operation ring and the second operation ring in the rotation axis direction of the first operation ring and the second operation ring and supported by the housing, and a rocker supported by the rocker shaft, wherein the rocker rocks in a first direction around the rocker shaft to be engaged with the second operation ring, and rocks in a second direction opposite to the first direction to be engaged with the first operation ring, and wherein the third operation ring includes a contact portion which comes in contact with the rocker to rock the rocker in the first direction according to the movement to the first position, and to rock the rocker in the second direction according to the movement to the second position.

(10) It is the lens device of (8), wherein the locking unit includes a first locking unit configured to be engaged with the first operation ring, and a second locking unit configured to be engaged with the second operation ring, wherein the third operation ring is provided at a position between the first operation ring and the second operation ring in the rotation axis direction of the first operation ring and the second operation ring, the third operation ring abutting on the first operation ring according to the movement to the first position, and abutting on the second operation ring according to the movement to the second position, wherein the first locking unit includes a first engagement portion formed on the outer peripheral portion of the housing, and a biasing member configured to bias the first operation ring against the first engagement portion in an opposite direction to a movement direction of the third operation ring from the second position to the first position, and wherein the second locking unit includes a second engagement portion formed on the outer peripheral portion of the housing, and a biasing member configured to bias the second operation ring against the second engagement portion in an opposite direction to a movement direction of the third operation ring to the second position.

(11) It is the lens device of (8), wherein the locking unit includes a first electromagnet that is mounted on the housing to face the first operation ring in the radial direction of the outer peripheral portion of the housing so as to attract the first operation ring, a second electromagnet that is mounted on the housing to face the second operation ring in the radial direction of the outer peripheral portion of the housing so as to attract the second operation ring, and a switch unit that controls energizing to the first electromagnet and the second electromagnet, and wherein the switch unit energizes the second electromagnet when the third operation ring is disposed at the first position and energizes the first electromagnet when the third operation ring is disposed at the second position.

(12) It is the lens device of (7), wherein the third operation ring covers the first operation ring or the second operation ring when the third operation ring is disposed at the first position or the second position.

(13) It is the lens device of any one of (7) to (12), wherein the plurality of positions to which the third operation ring is moved further include a third position where the third operation ring is non-engaged with both the first operation ring and the second operation ring.

(14) It is the lens device of (13), further comprising a drive unit including a first driving unit configured to rotationally drive the first operation ring, and a second driving unit configured to rotationally drive the second operation ring.

(15) It is the lens device of any one of (1) to (14), wherein the light transmittance variable filter is incorporated in the housing.

(16) It is the lens device of (15), further comprising a monitor configured to detect the transmittance of the light transmittance variable filter, and a control unit configured to perform a feed-back control of the transmittance of the light transmittance variable filter such that the transmittance detected by the monitor becomes a transmittance according to a rotation angle of the second operation ring.

(17) It is the lens device of any one of (1) to (14), wherein a signal according to a rotation angle of the second operation ring is transmitted to the image capturing apparatus so that a control unit within the image capturing apparatus controls the transmittance of the light transmittance variable filter provided within the image capturing apparatus.

(18) It is an image capturing apparatus provided with the lens device of any one of (1) to (17).

INDUSTRIAL APPLICABILITY

In the lens device and the image capturing apparatus having the same according to the present invention, an adjustment tool of a diaphragm device and an adjustment tool of a light transmittance variable filter are shaped to be excellent in usability such that a relative relationship of an adjustment amount of an amount of transmitted light in relation to each operation amount may be intuitively understood.

While the present invention has been described with reference to specific embodiments in detail, it is apparent to those skilled in the art that various changes or modifications may be made without departing from the spirit and scope of the present invention.

This application is based on Japanese Patent Application Nos. 2011-189789, 2011-189791, 2011-218529, and 2012-105319 filed on Aug. 31, 2011, Aug. 31, 2011, Sep. 30, 2011, and May 2, 2012, and the contents of which are incorporated herein by reference.

REFERENCE SIGNS LIST

1: image capturing apparatus body
2: lens device
5: photographer
8: focus ring
9: zoom ring
10: housing
11: iris ring (first operation ring)
12: ND filter ring (second operation ring)
14: partition plate
15: diaphragm device
16: light transmittance variable filter
17: potentiometer
18: ND filter control unit
19: transmittance monitor
20: image capturing element module
21: camera image processing unit
31: photographing lens
32: photographing lens

The invention claimed is:

1. A lens device for an image capturing apparatus incorporating a photographing lens and a diaphragm device configured to narrow an aperture area, the lens device comprising:
   a cylindrical housing that incorporates the photographing lens and the diaphragm device;
   a first operation ring that is mounted on an outer peripheral portion of the housing to be rotatable in a circumferential direction of the outer peripheral portion so as to adjust the aperture area of the diaphragm device; and
   a second operation ring that is mounted on the outer peripheral portion of the housing in parallel to the first operation ring to be rotatable coaxially with the first operation ring so as to adjust a transmittance of a light transmittance variable filter,
   wherein a correspondence relationship between an operation amount of the first operation ring and a change rate of an amount of transmitted light of the diaphragm device, and a correspondence relationship between an operation amount of the second operation ring and a change rate of an amount of transmitted light of the light transmittance variable filter are set to be the same.

2. The lens device of claim 1, wherein the first operation ring and the second operation ring are arranged close to each other.

3. The lens device of claim 2, further comprising a non-movable partition plate that is provided between the first operation ring and the second operation ring.

4. The lens device of claim 2, wherein a difference is made between a surface structure of an outer peripheral surface of the first operation ring and a surface structure of an outer peripheral surface of the second operation ring.

5. The lens device of claim 4, wherein the difference in surface structure is at least one or a combination of two or more of a difference of densities of knurled grooves formed on respective outer surfaces of the first operation ring and the second operation ring, a difference of shapes of irregularities formed on the respective outer surfaces of the first operation ring and the second operation ring, a difference of inclination angles of the respective outer surfaces of the first operation ring and the second operation ring with respect to an incident optical axis, a difference of widths of the respective outer surfaces of the first operation ring and the second operation ring, a difference of the numbers of notches placed in a circumference direction of the respective outer surfaces of the first operation ring and the second operation ring, a difference of surface roughnesses of the respective outer surfaces of the first operation ring and the second operation ring, a difference of hardnesses of materials formed on the respective outer surfaces of the first operation ring and the second operation ring, and a difference of heights of the respective outer surfaces of the first operation ring and the second operation ring.

6. The lens device of claim 5, further comprising a motor drive mechanism which uses the knurled outer surfaces of the first operation ring and the second operation ring as gears.

7. The lens device of claim 2, further comprising a third operation ring that is provided to be movable along a rotation axis of the first operation ring and the second operation ring to a plurality of positions including a first position at which the third operation ring is engaged with the first operation ring and a second position at which the third operation ring is engaged with the second operation ring, as well as to be rotatable in the circumferential direction of the outer peripheral portion.

8. The lens device of claim 7, further comprising a locking unit configured to restrict the rotation of the second operation ring when the third operation ring is disposed at the first position, and to restrict the rotation of the first operation ring, when the third operation ring is disposed at the second position.

9. The lens device of claim 8, wherein the locking unit includes a rocker shaft provided at a position between the first operation ring and the second operation ring in the rotation axis direction of the first operation ring and the second operation ring and supported by the housing, and a rocker supported by the rocker shaft,
wherein the rocker rocks in a first direction around the rocker shaft to be engaged with the second operation ring, and rocks in a second direction opposite to the first direction to be engaged with the first operation ring, and
wherein the third operation ring includes a contact portion which comes in contact with the rocker to rock the rocker in the first direction according to the movement to the first position, and to rock the rocker in the second direction according to the movement to the second position.

10. The lens device of claim 8, wherein the locking unit includes a first locking unit configured to be engaged with the first operation ring, and a second locking unit configured to be engaged with the second operation ring,
wherein the third operation ring is provided at a position between the first operation ring and the second operation ring in the rotation axis direction of the first operation ring and the second operation ring, the third operation ring abutting on the first operation ring according to the movement to the first position, and abutting on the second operation ring according to the movement to the second position,
wherein the first locking unit includes a first engagement portion formed on the outer peripheral portion of the housing, and a biasing member configured to bias the first operation ring against the first engagement portion in an opposite direction to a movement direction of the third operation ring from the second position to the first position, and
wherein the second locking unit includes a second engagement portion formed on the outer peripheral portion of the housing, and a biasing member configured to bias the second operation ring against the second engagement portion in an opposite direction to a movement direction of the third operation ring to the second position.

11. The lens device of claim 8, wherein the locking unit includes a first electromagnet that is mounted on the housing to face the first operation ring in the radial direction of the outer peripheral portion of the housing so as to attract the first operation ring, a second electromagnet that is mounted on the housing to face the second operation ring in the radial direction of the outer peripheral portion of the housing so as to attract the second operation ring, and a switch unit that controls energizing to the first electromagnet and the second electromagnet, and
wherein the switch unit energizes the second electromagnet when the third operation ring is disposed at the first position and energizes the first electromagnet when the third operation ring is disposed at the second position.

12. The lens device of claim 7, wherein the third operation ring covers the first operation ring and the second operation ring when the third operation ring is disposed at any one of the first position and the second position.

13. The lens device of claim 7, wherein the plurality of positions to which the third operation ring is moved further include a third position where the third operation ring is non-engaged with both the first operation ring and the second operation ring.

14. The lens device of claim 13, further comprising a drive unit including a first driving unit configured to rotationally drive the first operation ring, and a second driving unit configured to rotationally drive the second operation ring.

15. The lens device of claim 1, wherein the light transmittance variable filter is incorporated in the housing.

16. The lens device of claim 15, further comprising a monitor configured to detect the transmittance of the light transmittance variable filter, and
a control unit configured to perform a feed-back control of the transmittance of the light transmittance variable filter such that the transmittance detected by the monitor becomes a transmittance according to a rotation angle of the second operation ring.

17. The lens device of claim 1, wherein a signal according to a rotation angle of the second operation ring is transmitted to the image capturing apparatus so that a control unit within the image capturing apparatus controls the transmittance of the light transmittance variable filter provided within the image capturing apparatus.

18. An image capturing apparatus provided with the lens device of claim 1.

* * * * *